(12) United States Patent
Yamada

(10) Patent No.: US 9,147,011 B2
(45) Date of Patent: Sep. 29, 2015

(54) SEARCHING METHOD, SEARCHING APPARATUS, AND RECORDING MEDIUM OF SEARCHING PROGRAM

(75) Inventor: Kiichi Yamada, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 303 days.

(21) Appl. No.: 13/419,696

(22) Filed: Mar. 14, 2012

(65) Prior Publication Data

US 2012/0239684 A1 Sep. 20, 2012

(30) Foreign Application Priority Data

Mar. 18, 2011 (JP) ................................ 2011-061732

(51) Int. Cl.
 *G06F 17/30* (2006.01)
(52) U.S. Cl.
 CPC .... *G06F 17/30979* (2013.01); *G06F 17/30663* (2013.01); *G06F 17/30678* (2013.01)
(58) Field of Classification Search
 None
 See application file for complete search history.

(56) References Cited

U.S. PATENT DOCUMENTS

| | | | | |
|---|---|---|---|---|
| 5,758,149 A | * | 5/1998 | Bierma et al. ......................... | 1/1 |
| 6,003,036 A | * | 12/1999 | Martin .................................. | 1/1 |
| 6,334,124 B1 | * | 12/2001 | Bouchard et al. ..................... | 1/1 |
| 6,411,950 B1 | * | 6/2002 | Moricz et al. ......................... | 1/1 |
| 6,947,944 B1 | * | 9/2005 | Furuike ................................. | 1/1 |
| 7,277,918 B2 | * | 10/2007 | Lunenfeld ...................... | 709/203 |
| 2002/0099698 A1 | | 7/2002 | Abe et al. | |
| 2004/0181513 A1 | * | 9/2004 | Henderson et al. ................ | 707/3 |
| 2005/0154756 A1 | * | 7/2005 | Dettinger et al. ........... | 707/104.1 |
| 2009/0193352 A1 | * | 7/2009 | Bunn .............................. | 715/780 |
| 2010/0088314 A1 | * | 4/2010 | Kuang ............................ | 707/733 |
| 2011/0145315 A1 | * | 6/2011 | Walker et al. .................. | 709/203 |
| 2013/0103657 A1 | * | 4/2013 | Ikawa et al. ................... | 707/693 |

FOREIGN PATENT DOCUMENTS

| | | |
|---|---|---|
| JP | 3-123946 | 5/1991 |
| JP | 6-60121 | 3/1994 |
| JP | 10-40146 | 2/1998 |
| JP | 2002-222194 | 8/2002 |
| JP | 2008-310634 | 12/2008 |

OTHER PUBLICATIONS

Japanese Office Action dated Jun. 3, 2014 in corresponding Japanese Patent Application No. 2011-061732.

* cited by examiner

*Primary Examiner* — Robert Beausoliel, Jr.
*Assistant Examiner* — Susan F Rayyan
(74) *Attorney, Agent, or Firm* — Staas & Halsey LLP

(57) ABSTRACT

A searching apparatus includes a memory that stores a plurality of records, and a processor that executed a procedure, the procedure including searching a first record group, which is a part of a plurality of records, for a record satisfying a first search condition, and, in case of a second search condition being received during the searching, further searching a second record group, which is another part of the plurality of records, for a record satisfying either the first search condition and the second search condition.

13 Claims, 25 Drawing Sheets

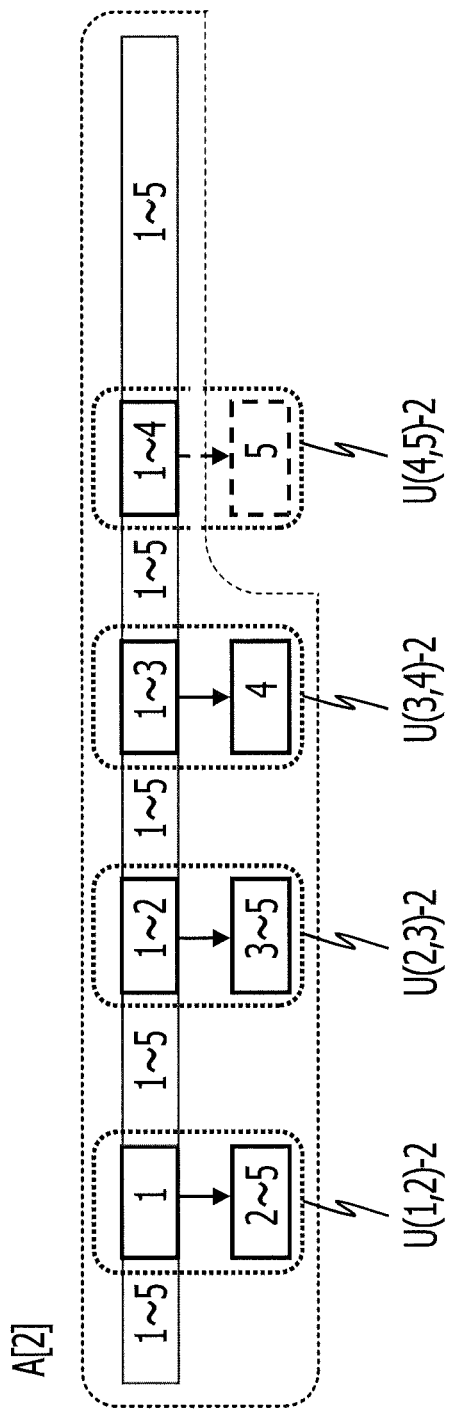
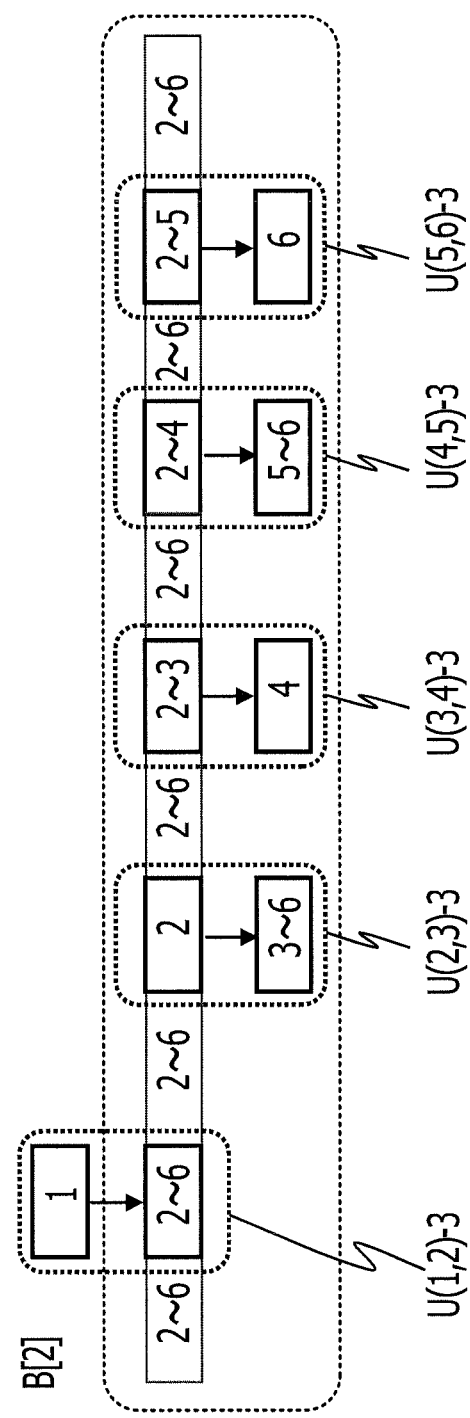
FIG. 23A
FIG. 23B

FIG. 25A

C [COUNT × S] = Δℓ* (2*M-1) * q1

FIG. 25B

B [COUNT × S] = q1*MEAN SEARCH TIME PER SEGMENT
= q1*LM

FIG. 25C $$C < B$$
$$\Delta l \times (2 \times M - 1) \times q_1 < q_1 \times \frac{L}{M}$$
$$\Delta l \times (2 \times M - 1) < \frac{L}{M}$$
$$\frac{\Delta n_1}{v} \times (2 \times M - 1) < \frac{L}{M}$$
$$\frac{r \times \frac{L}{M}}{v} \times (2 \times M - 1) < \frac{L}{M}$$
$$\frac{r}{v} \times (2 \times M - 1) < 1$$
$$\frac{v}{r} > 2 \times M - 1$$

US 9,147,011 B2

SEARCHING METHOD, SEARCHING APPARATUS, AND RECORDING MEDIUM OF SEARCHING PROGRAM

CROSS-REFERENCE TO RELATED APPLICATION

This application is based upon and claims the benefit of priority of the prior Japanese Patent Application No. 2011-61732, filed on Mar. 18, 2011, the entire contents of which are incorporated herein by reference.

FIELD

The embodiments discussed herein are related to a searching method, a searching apparatus, and a searching program.

BACKGROUND

A (transaction) searching technique of a database system is available. In the searching technique, a searching operation is performed in response to a plurality of search requests in the database system. Data are successively read from a database, and the searching operation is performed on each of successively read data in response to the plurality of search requests.

An exclusive control method of database is executed by performing a search operation and an update operation in a mixed fashion. The search operation is performed by referencing data only. The update operation is performed by generating a new version to data. In a technique contemplated in the exclusive control method, a version management table is arranged to manage multiple versions of data.

One system contemplated includes a database server serving as a front end responsive to a query to a database, and a plurality of database manipulation servers manipulating the database. The front end database server is connected to the database operation server via a network. The front end database server analyzes a query to the database including a plurality of database manipulation sentences including a structured query language (SQL) sentence. The database manipulation server determines at least one database manipulation sentence that is executed in response to one start request, and then partitions the sentences into groups. The database manipulation sentences in groups are then transferred to the database manipulation server at a time. The plurality of transferred database manipulation sentences are then started in response to a single start request.

If a transaction search is performed, a new search request may arrive at the database with the transaction search being in progress. The execution of the new search request is forced to wait until the end of the transaction search process. In this case, the waiting time for the new search request may be extended to time the transaction search process takes if the time is the longest. For example, if a new search request arrives at the database immediately subsequent to the start of the transaction search process, a response of an operation to the new search request may take about twice the time of the transaction search process. If a new search request arrives at the database immediately prior to the end of the transaction search process, a response of an operation to the new search request may take about the time of the transaction search process. The response of the operation depends on the timing of the arrival of the search request, and varies within a range of twice the time of the transaction search process. The same is true of an update request.

SUMMARY

According to an aspect of the invention, an apparatus includes a memory that stores a plurality of records, and a processor that executed a procedure, the procedure including searching a first record group, which is a part of a plurality of records, for a record satisfying a first search condition, and, in case of a second search condition being received during the searching, further searching a second record group, which is another part of the plurality of records, for a record satisfying either the first search condition and the second search condition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 23A, 23B illustrate another example of the search request process;
FIG. 25A-25C illustrate another example of the search request process.

DESCRIPTION OF EMBODIMENTS

Preferred embodiments of the present disclosure will be explained with reference to accompanying drawings.

Figure 1:
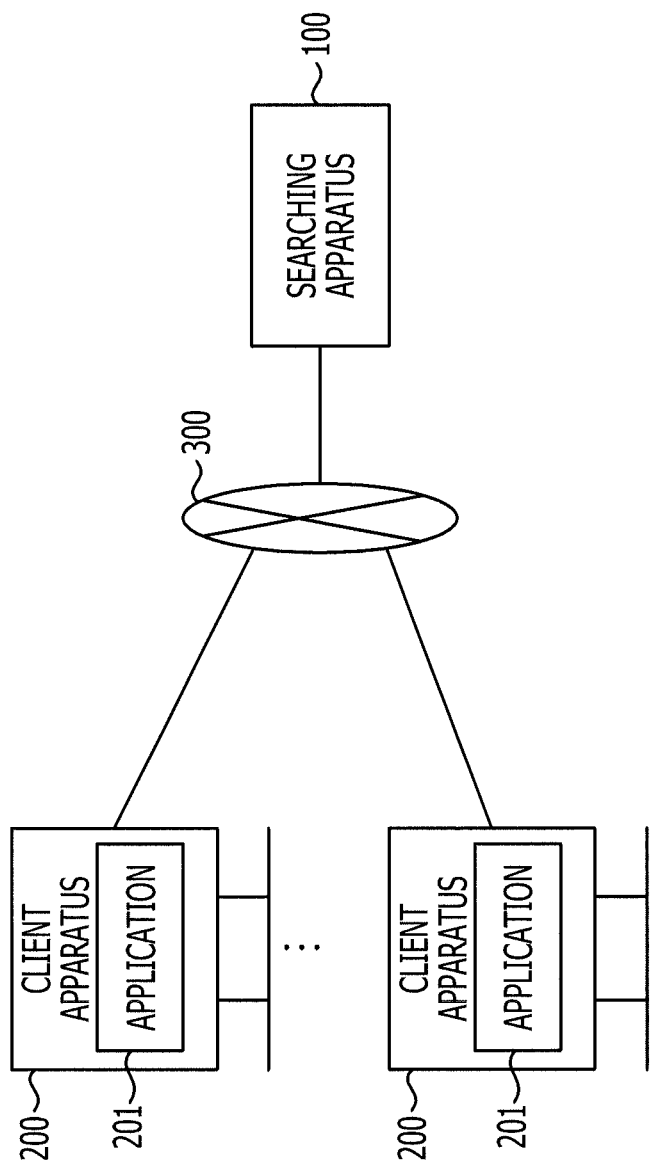
FIG. 1 illustrates an example of a search system.

FIG. 1 illustrates an example of a search system.

The search system includes a searching apparatus 100, a plurality of client apparatuses 200, and a network 300 connecting the searching apparatus 100 to the plurality of client apparatuses 200. The searching apparatus 100 is a database server, for example.

Each of the plurality of client apparatuses 200 includes an application 201. The application 201 is an execution requester that requests an execution. The application 201 transmits an execution request to the searching apparatus 100 via the network 300. The execution requests include a search request and an update request. The search request requests data reference only. The update request requests the updating of data through the generation of a new version of the data.

Upon receiving the search request, the searching apparatus 100 performs a search responsive to the received search request, and transmits data as search results in reply to the search request to the client apparatus 200 as a requesting source via the network 300. The client apparatus 200 as the requesting source receives the data as the search results. Upon receiving an update request, the searching apparatus 100 performs an update process in response to the received update request, and updates the data.

Figure 2:
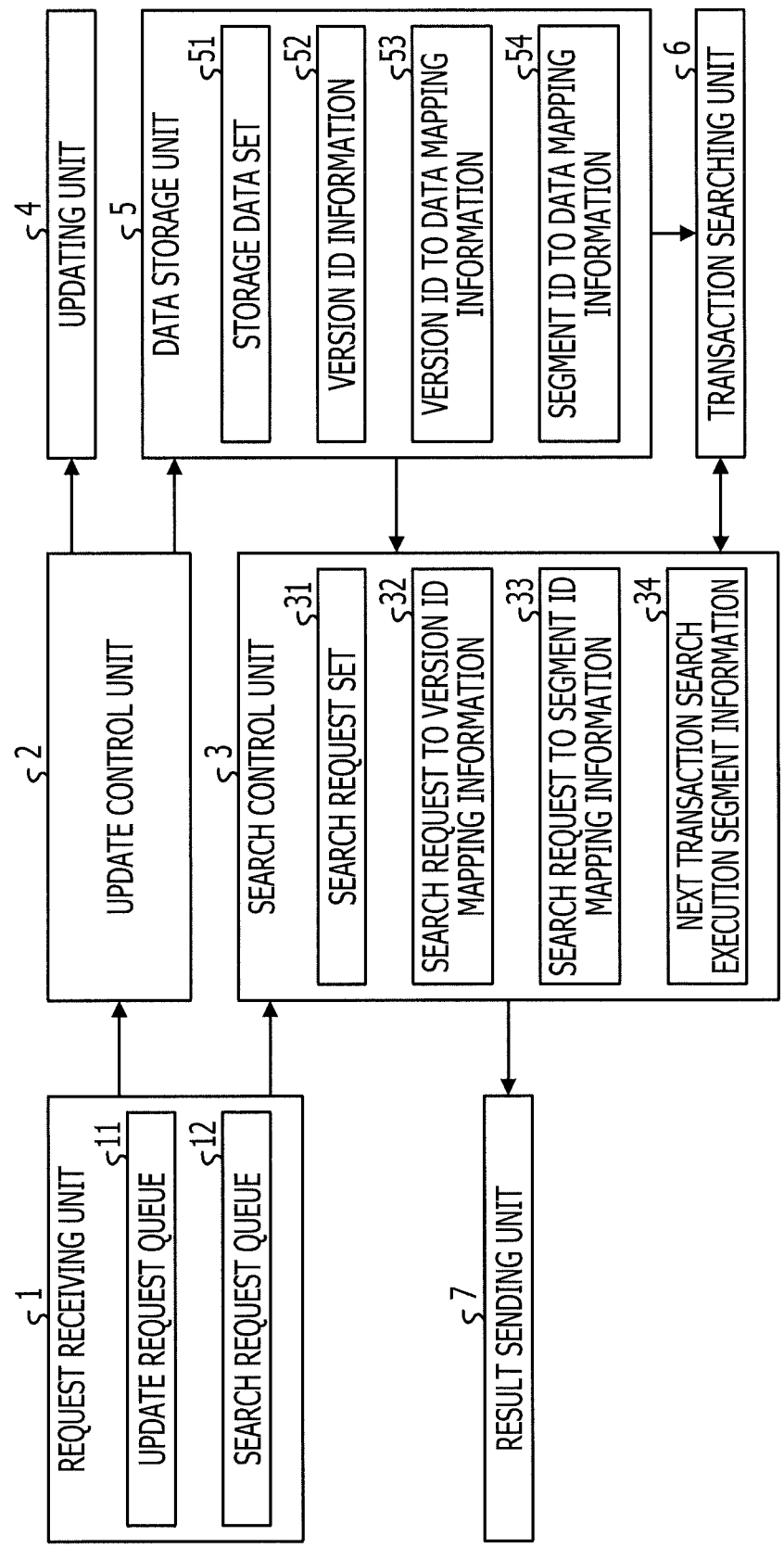
FIG. 2 illustrates a searching apparatus in the search system of FIG. 1.

FIG. 2 illustrates an example of the searching apparatus 100 in the search system of FIG. 1.

The searching apparatus 100 includes request receiving unit 1, update control unit 2, search control unit 3, updating unit 4, data storage unit 5, transaction searching unit 6, and result sending unit 7. The request receiving unit 1 includes an update request queue 11 and a search request queue 12. The search control unit 3 stores control information for transaction search. More specifically, the control information for transaction search includes a search request set 31 stored on a search request set storage unit, search request to version ID mapping information 32 stored on a search request to version ID mapping information storage unit, search request to segment ID mapping information 33 stored on a search request to segment ID mapping information storage unit, and next transaction search execution segment information 34 stored on a next transaction search execution segment information storage unit. The data storage unit 5 stores control information for transaction search. More specifically, the control information for transaction search includes storage data set 51 stored on a storage data set storage unit, version ID information 52 stored on a latest version ID information storage unit, version ID to data mapping information 53 stored on a version ID to data mapping information storage unit, and segment ID to data mapping information 54 stored on a segment ID to data mapping information storage unit.

The search control unit 3 includes the search request set storage unit, the search request to version ID mapping information storage unit, the search request to segment ID mapping information storage unit, and the next transaction search execution segment information storage unit. The data storage unit 5 includes the storage data set storage unit, the latest version ID information storage unit, the version ID to data mapping information storage unit, and the segment ID to data mapping information storage unit.

Described below are the search request set 31, the search request to version ID mapping information 32, the search request to segment ID mapping information 33, the next transaction search execution segment information 34, the storage data set 51, the version ID information 52, the version ID to data mapping information 53, and the segment ID to data mapping information 54.

The searching apparatus 100 is a database server that stores a plurality of data (records) on the data storage unit 5 serving as a database. In the data storage unit 5, actual data are stored in the storage data set 51. In response to an update request received from the client apparatus 200, the updating unit 4 under the control of the update control unit 2 updates data stored on the data storage unit 5 serving as the database in the searching apparatus 100. In response to a search request received from the client apparatus 200, the transaction searching unit 6 under the control of the search control unit 3 transaction searches for data stored on the data storage unit 5 serving as the database in the searching apparatus 100.

The request receiving unit 1 receives the search request transmitted from the application 201 in the client apparatus 200, and concatenates the search requests successively into the search request queue 12. The search request includes a "search" type request, a version of data to be searched, and a search criterion. The search criteria may be a data name of data to be searched (record ID).

The search control unit 3 references the search request queue 12, retrieves at least one search request, and adds at least one search request to the search request set 31 for transaction search. The search control unit 3 determines a transaction search execution segment throughout which a transaction search is to be performed, i.e., a next transaction search execution segment. The search control unit 3 calls the transaction searching unit 6, and passes the search request set 31 over to the transaction searching unit 6. The search control unit 3 thus requests the transaction searching unit 6 to perform a transaction search over the determined transaction search execution segment.

The search request set 31 includes but is not limited to a single search expression (query) resulting from OR gating a plurality of search requests. The search request set 31 may be a search expression newly generated from a plurality of search requests. The search expression generated from the plurality of search requests may be a group of search requests that is generated to implement transaction search technique such as high-traffic technique.

Upon receiving a transaction search request from the search control unit 3, the transaction searching unit 6 executes a transaction search over a requested transaction search segment. In other words, the transaction searching unit 6 performs a transaction search process on a plurality of data stored in the storage data set 51 in the data storage unit 5 serving as a database. The transaction searching unit 6 returns to the search control unit 3 search results of the transaction search process as a response to the request of the transaction search.

In the transaction search process, reference is made on data retrieved from search target data using a "search request set" including a plurality of search requests. It is sufficient if the search target data are retrieved once. This arrangement reduces the number of scans on the data. The processing speed of the search process responsive to a plurality of search requests is increased. In the embodiment, the transaction search process is performed on the data over the determined execution segment.

Upon receiving the search results from the transaction searching unit 6, the search control unit 3 transfers the received search results to the result sending unit 7. The result sending unit 7 sends, i.e., returns the search results to the application 201 in the client apparatus 200 as a requesting source of the search request. The search control unit 3 deletes from the search request set 31 the search request of the search process that has been completed on the plurality of data stored in the storage data set 51.

The request receiving unit 1 receives an update request transmitted from the application 201 in the client apparatus 200, and concatenates the update requests into the update request queue 11. The update request includes an "update" type request, a version of pre-update data, and a difference between pre-update data and post-update data.

The update control unit 2 references the update request queue 11, and retrieves at least one update request present in the update request queue 11. The update control unit 2 determines a new version of data, i.e., the latest version ID. The latest version of data is determined. The update control unit 2 calls the updating unit 4, passes at least one update request to the called updating unit 4, and requests the updating unit 4 to update the data.

Upon receiving the update request of data from the update control unit 2, the updating unit 4 updates the data specified by the update request. In response to at least one update request, the updating unit 4 updates the data stored in the storage data set 51 on the data storage unit 5 serving as the database. In this way, each time the update request is made, a new version of the data is generated in the storage data set 51.

The execution of a plurality of search requests and the execution of a plurality of update request are described in detail below.

Figure 3:
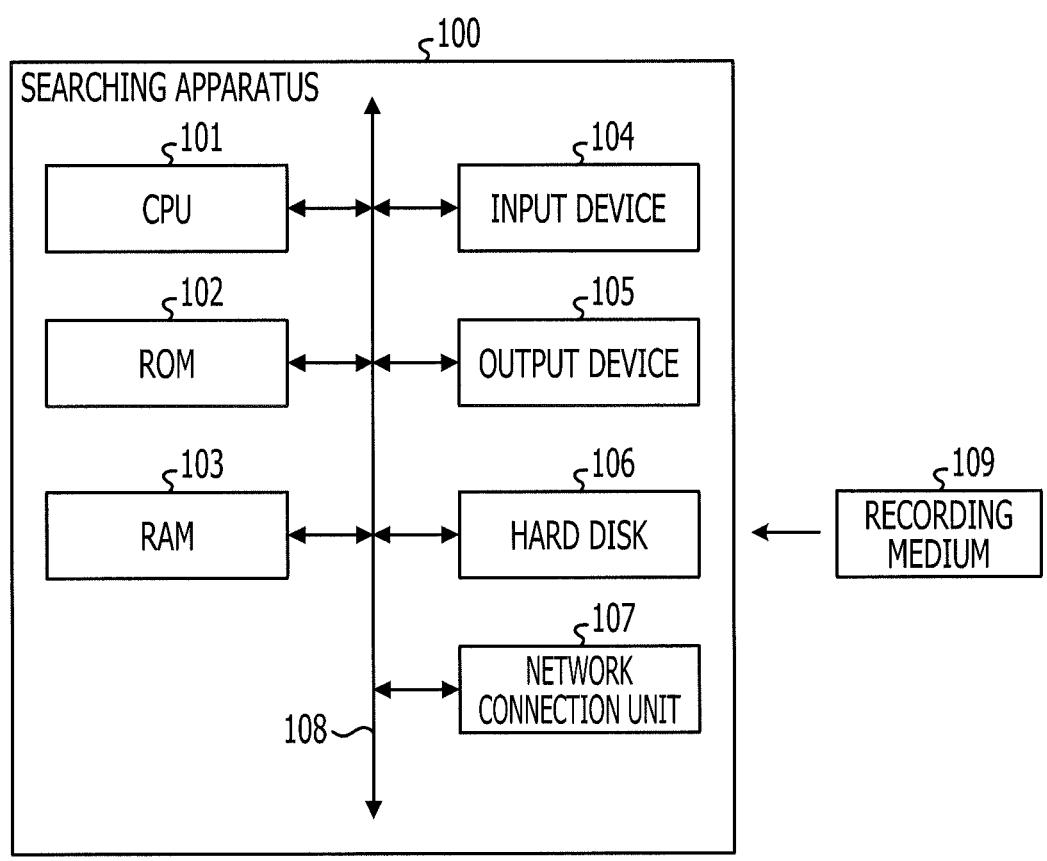
FIG. 3 illustrates a hardware configuration of the searching apparatus of FIG. 2.

FIG. 3 illustrates a hardware configuration of the searching apparatus 100 of FIG. 2.

A central processing unit (CPU) 101 controls the searching apparatus 100 in accordance with a control program stored on a read-only memory (ROM) 102. The CPU 101 is an example of a processor which executes a search program stored on a random-access memory (RAM) 103 as the main memory. The request receiving unit 1, the update control unit 2, the search control unit 3, the updating unit 4, the transaction searching unit 6, and the result sending unit 7 are implemented in this way. The processor is a hardware to carry out operations based on at least one program (such as the search program) and control other hardware, such as the CPU 101, a GPU (Graphics Processing Unit), FPU (Floating point number Processing Unit) and DSP (Digital signal Processor). The search program is stored on a recording medium 109 such as a compact-disk ROM (CD-ROM), or digital versatile disk (DVD), is input from the recording medium 109 to a hard disk 106, and is then loaded from the hard disk 106 to the RAM 103.

The data storage unit 5 is arranged on the hard disk 106. In other words, data are stored on the hard disk 106. For example, the data are stored on the recording medium 109 such as the CD-ROM or DVD, are input from the recording medium 109 to the hard disk 106, are loaded from the hard disk 106 to the RAM 103 as appropriate, and processed by one of the updating unit 4 and the transaction searching unit 6.

The input device 104 may be a keyboard, and may further include a mouse. The output device 105 may be a display, and may further include an output device such as a printer. The CPU 101, the ROM 102, the RAM 103, the input device 104, the output device 105, the hard disk 106, and the network connection unit 107 are interconnected to each other via a bus 108.

The network connection unit 107 is a transceiver, for example. The network connection unit 107 may be connected to the network 300, and then connected to another computer such as the client apparatus 200 via the network 300. The searching apparatus 100 communicates with the client apparatus 200 in this way.

The data storage unit 5 may be arranged in another information processing apparatus connected to the searching apparatus 100 via a network. In such a case, the data storage unit 5 may be arranged in a hard disk in the other information processing apparatus. Data may be stored on a recording medium such as a CD-ROM or DVD, input from the recording medium to the hard disk on the other information processing apparatus, loaded on a RAM in the other information processing apparatus as appropriate, transmitted from a network connection unit to the network connection unit 107 in the searching apparatus 100, and then processed by one of the updating unit 4 and the transaction searching unit 6.

A hardware configuration of the client apparatus 200 may be identical to the hardware configuration of the searching apparatus 100 illustrated in FIG. 3.

Figure 4:
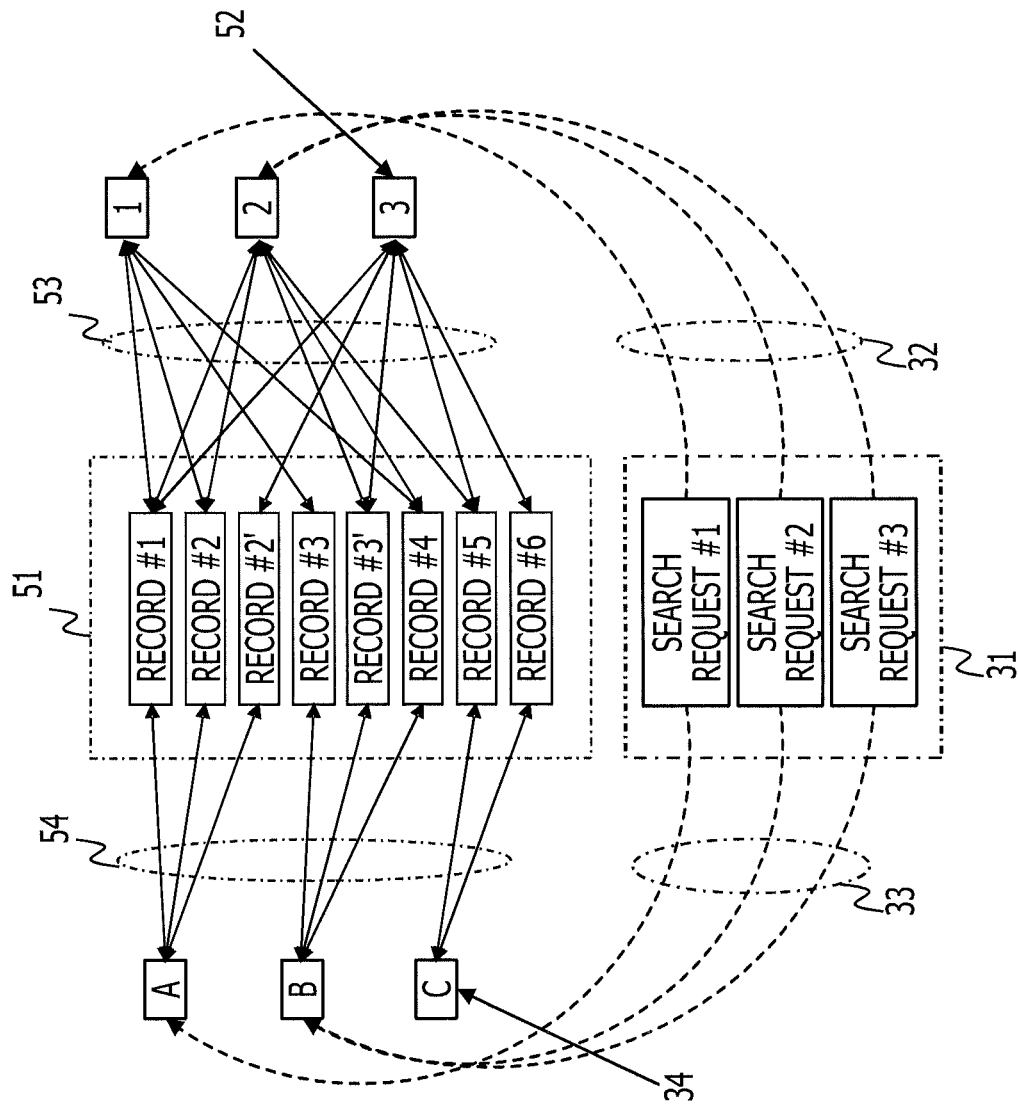
FIG. 4 illustrates a data structure.
Figure 5:
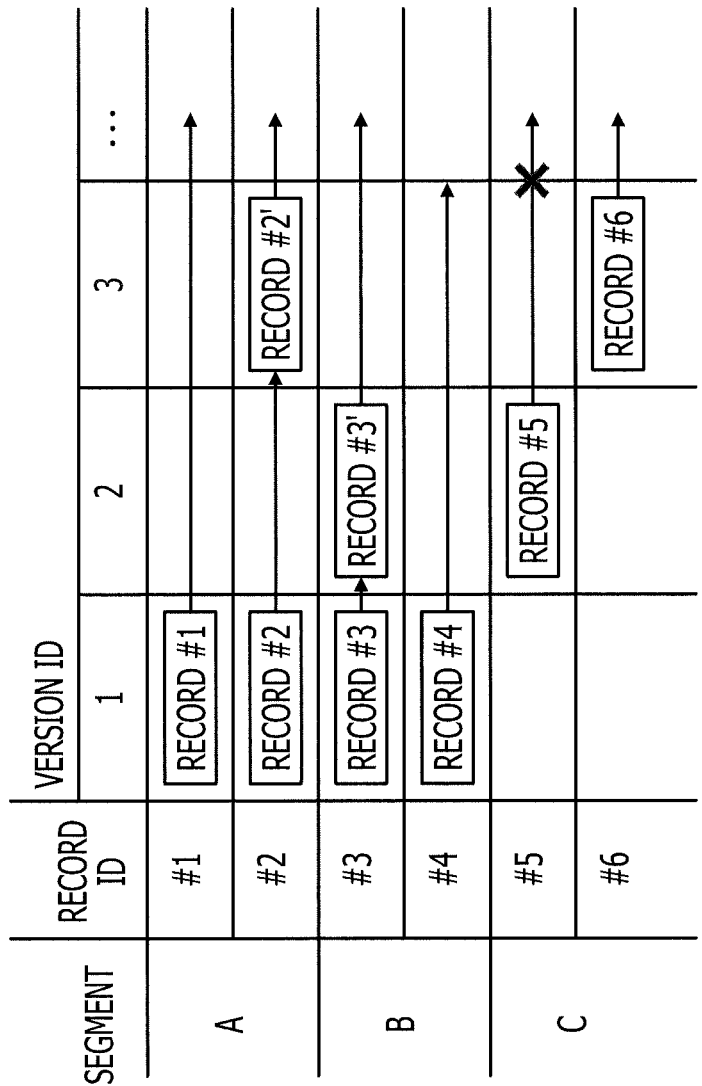
FIG. 5 illustrates the data structure.

For convenience of explanation, a data structure of the searching apparatus 100 is described first with reference to FIGS. 4 and 5.

FIG. 4 illustrates the data structure. FIG. 4 particularly illustrates the storage data set 51 and a variety of control information for transaction searching the storage data set 51.

The storage data set 51 is data stored on the data storage unit 5 serving as the database. The storage data set 51 includes a plurality of data elements of "record #1," "record #2," and other records. Each data element has a record ID such as a data name "record #1" and is identified by the record ID. The record ID is identification information uniquely identifying the data.

The storage data set 51 includes a plurality of versions of a given data element such as record #2, and record #2'. The record #2' results from updating the "record #2" once. More specifically, the record #2' is a data element having a version ID equal to an incremented-by-1 version of the version ID of the record #2. Even if the search target is data different in version from search request to search request, the searching is completed by a single transaction search process rather than a plural times of transaction search processes.

The version ID information 52 indicates the latest version of data stored in the storage data set 51. The version of the data is represented by the version ID. The version ID is identification information uniquely identifying the version of the data. The version ID information 52 is the latest version ID of the data stored in the storage data set 51.

The version IDs are numbers "1" through "3" to the right of the storage data set 51 in FIG. 4. As illustrated in FIG. 4, the storage data set 51 includes data of versions "1" through "3."

The version ID to data mapping information 53 is mapping information between the version ID and the data. The version ID to data mapping information 53 maps a version generated as a result of an update process to the data included in that version. As illustrated in FIG. 4, a "line segment" serving part of the version ID to data mapping information 53 links the record #1 to the version ID "1." The arrangement indicates that the record #1 is generated as a version ID "1" through the update process, in other words indicates that the record #1 has the version ID "1."

The version ID to data mapping information 53 in practice is stored in a version ID to data mapping information table. The version ID to data mapping information table stores, in map to the data such as the record #1, the version ID of the data.

The segment ID to data mapping information 54 is "mapping information between the segment ID and the data." The segment ID to data mapping information 54 represents the mapping relation between the segment ID indicating each segment into which the storage data set is partitioned and the data assigned to the segment.

The segment ID is represented by alphabets "A" through "C" to the left hand side of the storage data set 51 as illustrated in FIG. 4. The storage data set 51 is partitioned into segments "A" through "C" as illustrated in FIG. 4. Each of the segments "A" through "C" includes a plurality of data elements (records). The storage data set 51 of FIG. 4 include a plurality of record groups belonging to the segments "A" through "C," respectively.

As illustrated in FIG. 4, a "line segment" serving as part of the period ID to data mapping information 54 links the record #1 to the segment ID "A." In this way, FIG. 4 illustrates that the record #1 is grouped to the segment "A" through the update process, i.e., that the record #1 has a segment ID "A."

The segment ID to data mapping information 54 is stored in a segment ID to data mapping information table. The period ID to data mapping information table stores, in map to the data such as the record #1, the segment ID of the data.

When the updating unit 4 requests the data storage unit 5 to perform the update process, the data storage unit 5 serving as a database performs the update process in response to the update request. Each time the update request is executed, the data storage unit 5 generates or updates the storage data set 51, the version ID information 52, the version ID to data mapping information 53, and the segment ID to data mapping information 54, and then stores the resulting data on the respective storage units.

The search request set 31 is a received search request, and represents a set of search requests having not undergone the search process yet. The search request set 31 includes a plurality of search requests such as a "search request #1," and a "search request #2." Each of the search requests has a search request ID like "#1" and is identified by the search request ID. The search request ID is identification information uniquely identifying the search request.

The search request to version ID mapping information 32 is "mapping information between the search request and the search target data version ID", and indicates a version of the data serving as a search target of the search request. As illustrated in FIG. 4, a "broken-line segment" serving as part of the search request to version ID mapping information 32 links a "search request #1" to a version ID "1." This arrangement indicates that the "search request #1" has as a search target the data having the version ID "1."

In practice, the search request to version ID mapping information 32 is stored in a search request to version ID mapping table. The search request to version ID mapping table stores, in map to the search request such as the "search request #1," the version ID of the data serving as the search target of the search request.

The search request to segment ID mapping information 33 is "mapping information between the search request and the search start segment ID," and indicates the segment ID of the segment at which the search of the search request starts. As illustrated in FIG. 4, a "broken-line segment" serving as part of the search request to segment ID mapping information 33 links the "search request #1" to a segment ID "A." This arrangement indicates that the "search request #1" has started with the segment ID "A."

In practice, the search request to segment ID mapping information 33 is stored in a search request to segment ID mapping table. The search request to segment ID mapping table stores, in map to the search request such as the "search request #1," the segment ID at the start of the search request.

The next transaction search execution segment information 34 represents a "next transaction search execution segment ID" and indicates a segment that serves as a next search target of the transaction searching unit 6. As described below in detail, the transaction searching unit 6 partitions the storage data set 51 into a plurality of segments, and circulates through the plurality of partitioned segments in accordance with a predetermined order to perform the transaction search process. The next transaction search execution segment information 34 represents a segment ID of a segment that is transaction searched next by the transaction searching unit 6.

The search control unit 3 retrieves a search request from the search request queue 12. In order to perform the transaction search process, the search control unit 3 at each retrieval of the search requests generates or updates the search request set 31, the search request to version ID mapping information 32, the search request to segment ID mapping information 33, and the next transaction search execution segment information 34 and then stores the resulting data on the respective storage units thereof.

FIG. 5 illustrates a data structure. With reference to FIG. 5, the addition, the update and the deletion of the data (record) in the storage data set 51 are described.

In the storage data set 51, data having a version ID "1" are record #1 through record #4. The updating unit 4 stores the record #1 through the record #4 in the storage data set 51. In this storage process, the updating unit 4 assigns the record #1 and the record #2 to the segment "A" and the record #3 and the record #4 to the segment "B." In this way, the counts of record IDs belonging to each segment are equalized.

By updating part of the data in response to the update request, the updating unit 4 generates data having a version ID "2." As illustrated in FIG. 5, a record #3' results from updating (replacing) the record #3 and a record #5 is added. The update request of the "record #3" is a replace request, and the update request of the record #5 is an add request.

The record #3' results from updating the record #3 belonging to the segment "B," and the record #3' belongs to the segment "B." Since the latest version ID is "1," the record #3' has a version ID "2." The latest version ID is incremented to "2." Since the record #5 is the newly added data, and is set to belong to a segment "C." The record #5 has the version ID "2."

The updating unit 4 generates data having a version ID "3" by partially updating data in response to a new update request. As illustrated in FIG. 5, the record #2' results from updating (replacing) the record #2, a record #6 is added, and the record #4 is deleted. The update request of the record #2 is a replace request, the update request of the record #6 is an add request, and the update request of the record #4 is a delete request.

The record #2', resulting from updating the record #2 belonging to the segment "A," belongs to the segment "A." The latest version ID of the record #2 is "2," and the record #2' has a version ID "3." The latest version ID is incremented to "2." The record #6 is the newly added data, and is set to belong to the segment "C." The record #6 has the version ID "3."

The transaction search of the searching apparatus 100 is described below with reference to FIG. 6.

Figure 6:
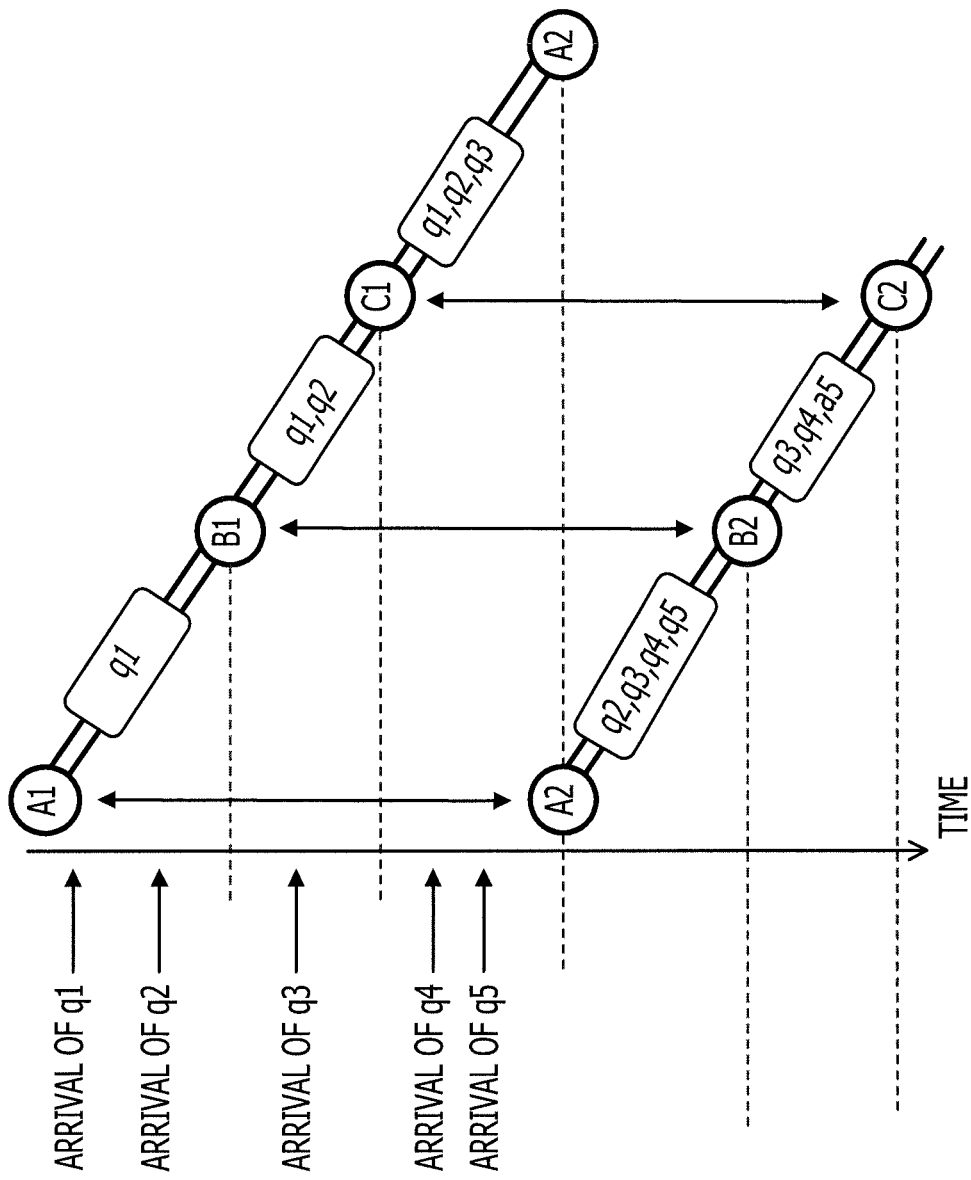
FIG. 6 illustrates a search process.

FIG. 6 illustrates the search process. As illustrated in FIG. 6, the "search request #1" is referred to as "q1."

The transaction searching unit 6 circulates through the storage data set 51, partitioned into a plurality of segments A-C, in a predetermined order, while performing the transaction search process in a cyclic fashion. In other words, the transaction searching unit 6 performs the transaction search process in the order of the segment A, the segment B, and the segment C, and then repeats again. For example, the transaction searching unit 6 starts the transaction search process of the segment A at point A1, and ends the transaction search process of the segment A at point B1. The transaction searching unit 6 starts the transaction search process of the segment B at point B1, and ends the transaction search process of the segment B at point C1. The transaction searching unit 6 starts the transaction search process of the segment C at point C1, and ends the transaction search process of the segment C at point A2. Subsequent to point A2, the transaction searching unit 6 repeats the transaction search process in the order described above. A segment from point A1 to point B1 is the segment A, a segment from point B1 to point C1 is the segment B, and a segment from point C1 to point A2 is the segment C.

When a new search request has arrived, the search control unit 3 adds the newly arrived search request to the search request set 31. Prior to point A1, "q1" has arrived at the search request queue 12, and is the search request set 31. The transaction searching unit 6 performs the transaction search process in accordance with a search request set "q1" over the segment A. The search request set "q1" including a single search request is still a search request set. Since "q2" arrives at the search request queue 12 in the middle of the transaction search process of the segment A, "q2" is newly added to the search request set 31. The transaction searching unit 6 performs the transaction search process over the segment B in accordance with the search request set "q1 and q2."

When the transaction search process is complete in accordance with a given search request, in other words, when the transaction search process including a given search request is complete over the segments A-C of the storage data set 51, the search control unit 3 deletes the search request from the search request set 31. Since the search of "q1" starts at point A1, the search over all the segments A-C is complete at point A2. The search control unit 3 deletes "q1" from the search request set 31 at point A2. Since the search of "q2" starts at point B1, the search control unit 3 deletes "q2" from the search request set 31 at point B2.

The transaction search process starts at different points and different segments depending on the timing of the arrival of the search request at the search request queue 12. In this way, a search request newly arriving at the search request queue 12 in the middle of the transaction search process is added to the search request set 31.

If the transaction search process is repeated successively on the segments A-C, an update request newly arriving at the update request queue 11 in the middle of the transaction search process is difficult to execute. The update process is kept waiting until the search process reaches a break. A break point of the search process is arranged. More specifically, at each of the points A1, B1, and C1, i.e., each time the transaction search process completes over the segments A-C of the storage data set 51, at least one update request having arrived at the update request queue 11 is executed.

Each time each point is passed, a post-process of the completed transaction search process, a process of an update request, a pre-process of the transaction search process to be started are performed. The post-process of the completed transaction search process includes returning the results of the transaction search process from the transaction searching unit 6 to the search control unit 3, and deleting the search request of the search completed over all the segments. The process of the update request is an update process performed by the updating unit 4. The pre-process of the transaction search process to be started is to generate in response to a new search request the search request set 31, the search request to version ID mapping information 32, the search request to segment ID mapping information 33, and the next transaction search execution segment information 34, and then to request the transaction searching unit 6 to execute the transaction search process.

In this way, the update request is executed while the transaction search process is performed. Rather than searching data having a single version, the transaction search process searches the set sum of data having a plurality of versions that serve as the search targets of a plurality of search requests included in the search request set 31. This arrangement reduces the possibility that any version of data escapes searching.

If viewed from a given search request included in the search request set 31, the search results may include search results of a version not being a search target of the search request. As described below, a version as a search target of another search request is excluded. Unwanted results are excluded from the search results.

As illustrated in FIGS. 2 through 6, an update request and a transaction search process including a plurality of search requests are executed as described below.

Each time the data is added, updated, or deleted, the data storage unit 5 serving as the database updates the storage data set 51, the version ID information 52, the version ID to data mapping information 53, and the segment ID to data mapping information 54 such that these data elements account for the addition, update, and deletion of the data as illustrated in FIGS. 4 and 5.

More specifically, in response to an update request from the updating unit 4, the data storage unit 5 adds, updates, and deletes data (record) on the storage data set 51. As illustrated in FIGS. 4 and 5, the data storage unit 5 determines a record ID in the storage data set 51. The data storage unit 5 partitions a plurality of data elements, i.e., a plurality of records, included in the storage data set 51 stored on the storage data set storage unit into a plurality of segments A-C, i.e., a plurality of record groups.

Each time data are added to or deleted from the storage data set 51, the data storage 5 generates the latest version ID, and stores the latest version ID as the latest version ID information. The version ID information 52 is generated by incrementing the present version ID information 52 by +1.

Each time data are added to or deleted from the storage data set 51, the data storage 5 generates the version ID to data mapping information 53, and then adds the version ID to data mapping information 53 on the version ID to data mapping information storage unit. The version ID to data mapping information 53 is generated by mapping the latest version ID generated as a result of the addition or update to the added or updated data (record).

Each time data are added to or deleted from the storage data set 51, the data storage 5 generates the segment ID to data mapping information 54 that is the mapping information between the added or updated data (record) and the segment ID at the start of the search, and then adds the segment ID to data mapping information 54 on the period ID to data mapping information storage unit. The segment ID to data mapping information 54 is generated by mapping the segment ID, to which the added or updated data belongs, to the added or updated data. The segment ID to which the added or updated data belongs is determined at the addition or update of the data as described above.

As illustrated in FIG. 6, the search control unit 3 repeats the transaction search process over a plurality of segments of the storage data set 51, in other words, a plurality of record groups in the predetermined order. The transaction search process is a search process that is performed to determine at a time whether the search request set 31, i.e., the plurality of search requests are satisfied. The plurality of search requests include a search request that is received when a search process is performed on a segment immediately preceding a search target segment, i.e., on a record group immediately preceding a record group as a search target.

Each time the search request is retrieved from the search request queue 12, in other words at each of the points in FIG. 6, the search control unit 3 updates the search request set 31, the search request to version ID mapping information 32, the search request to segment ID mapping information 33, and the next transaction search execution segment information 34 such that these pieces of information account for the retrieved search request as illustrated in FIGS. 4 and 6.

The retrieval of the search request from the search request queue 12 is performed at a point when the transaction search process over one segment is complete. As described below, the search request set 31, the search request to version ID mapping information 32, the search request to segment ID mapping information 33, and the next transaction search execution segment information 34 are updated at a point when the transaction search process over one segment is complete.

The search control unit 3 adds at least one search request retrieved from the search request queue 12 to the search request set 31. In other words, the search control unit 3 generates a new search request set 31 that results from adding at least one search request retrieved from the search request queue 12 to at least one search request included in the search request set 31.

The versions of data serving as search targets of a plurality of search requests may be different from each other. The transaction search process may be performed on the data of different versions. This arrangement increases transaction isolation level between the plurality of search requests.

Each time a search request is added to the search request set 31, the search control unit 3 generates the search request to version ID mapping information 32, and adds the search request to version ID mapping information 32 to the search request to version ID mapping information storage unit. The search request to version ID mapping information 32 results from mapping the search request in the search request set 31 to the version ID of the data as the search target of the search request. The version ID of the data as the search target of the search request is determined by the search request.

As described below, the search control unit 3 may determine the version ID of the data as the search target of the search request.

Each time the search request is added to the search request set 31, the search control unit 3 generates the search request to segment ID mapping information 33 and adds the generated search request to segment ID mapping information 33 to the search request to segment ID mapping information storage unit. The search request to segment ID mapping information 33 results from mapping the search request in the search request set 31 to the segment ID at the start of the search of the search request. The next transaction search execution segment information 34 is used as the segment ID at the start of the search of the search request as described below.

Each time the search request is added to the search request set 31, the search control unit 3 generates the next transaction search execution segment information 34, and then stores the generated next transaction search execution segment information 34 on the next transaction search execution segment information storage unit. The next transaction search execution segment information 34 results from determining a next segment ID subsequent to the segment ID indicated by the present next transaction search execution segment information 34.

The search control unit 3 calls the transaction searching unit 6, and requests the called transaction searching unit 6 to perform the transaction search process.

The transaction searching unit 6 determines the set sum of data of at least one version serving as search targets of a plurality of search requests included in the search request set 31. The transaction searching unit 6 performs the transaction search process on the determined set sum using the search request set 31. The transaction searching unit 6 excludes a version not being the search target from the search results of the transaction search process.

In the search responsive to the single search request "q1" of FIG. 6, records are successively read from one segment as part of the plurality of records stored in the storage data set 51, i.e., from a first record group, and it is determined whether the read record satisfies the search request "q1," and at least one record satisfying the search request "q1" is retrieved in accordance with the determination results.

If the first search request "q1" is received, a first search is executed. In the first search, a record of the first record group in the storage data set 51 satisfying the first search request "q1" is retrieved. If the second search request "q2" is received in the middle of the execution of the first search request "q1," a second search is performed to retrieve, from records of the second record group different from the first record group, a record satisfying the first search request "q1" and a record satisfying the second search request "q2."

In the transaction search process responsive to the search request set 31 including the first search request "q1" and the second search request "q2" of FIG. 6, records are successively read from a segment as part of the plurality of records stored in the storage data set 51. It is then determined whether the read record satisfies one of the first search request "q1" and the second search request "q2," and a record satisfying the first search request "q1" and a record satisfying the second search request "q2" are retrieved in accordance with the determination results. If the second search request "q2" is received in the middle of the execution of the first search request "q1" on a first segment, the transaction search process is performed over a second segment in succession to the first segment in response to the search request set 31 including the first search request "q1" and the second search request "q2." Waiting time to the search execution is thus reduced, and a variation in the response to the search request is reduced.

After the first search request "q1" is performed over all the segments of the storage data set 51, i.e., on all the record groups, the search control unit 3 excludes the first search request "q1" from the plurality of search requests included in the search request set 31 at point A2 of FIG. 6. Since the search process responsive to the first search request "q1" is included in the search request set 31 for the transaction search process, and is included as the search process responsive to the search request set 31. When the search process is performed in response to the search request set 31, the search control unit 3 updates the search request to version ID mapping information 32 and the search request to segment ID mapping information 33, relating to the first search request "q1".

An update request of any of the records in the storage data set 51 may be received when the transaction search process is performed over any of the segments, i.e., over any of the record groups in the plurality of record groups. After the transaction search process presently in progress is complete over the segment, the update control unit 2 executes the update request before a next segment in succession to the segment as the target of the transaction search process presently in progress. In other words, the update request is executed at each point of FIG. 6 prior to the start of the transaction search process on the record group serving as a target subsequent to the record group as the target of the transaction search process presently in progress. The waiting time until the execution of the update request is reduced, and a variation in the response to the update request is reduced.

An update request to a record included in the second record group may be received within a period from the reception of the first search request "q1" to the reception of the second search request "q2" in FIG. 6. In such a case, the updating unit 4 performs the update process in response to the update request. The data storage unit 5 stores a pre-update record, a post-update record, and version IDs (version information) respectively identifying the pre-update record and the post-update record in a mapped state. The storage data set 51 maps the first search request "q1" to the version ID of the pre-update record and the second search request "q2" to the version ID of the post-update record.

The transaction searching unit 6 performs the transaction search process in response to the search request set 31 including the first search request "q1" and the second search request "q2" and then retrieves a record satisfying the first search request "q1" and a record satisfying the second search request "q2." The search control unit 3 determines whether any of the pre-update record and the post-update record out of the retrieved records satisfies the first search request "q1" or the second search request "q2."

A delete request of one of the records in the storage data set 51 may be received when the transaction search process is being performed over one of the segments, i.e., one of the record groups. In this case, the update control unit 2 executes the delete request after the transaction search process is performed at least by one time over all the segments, i.e., on all the records in the predetermined order subsequent to the end of the transaction search process presently in progress over the segment.

The search process and the update process are described below with reference to process flows.

Figure 7:
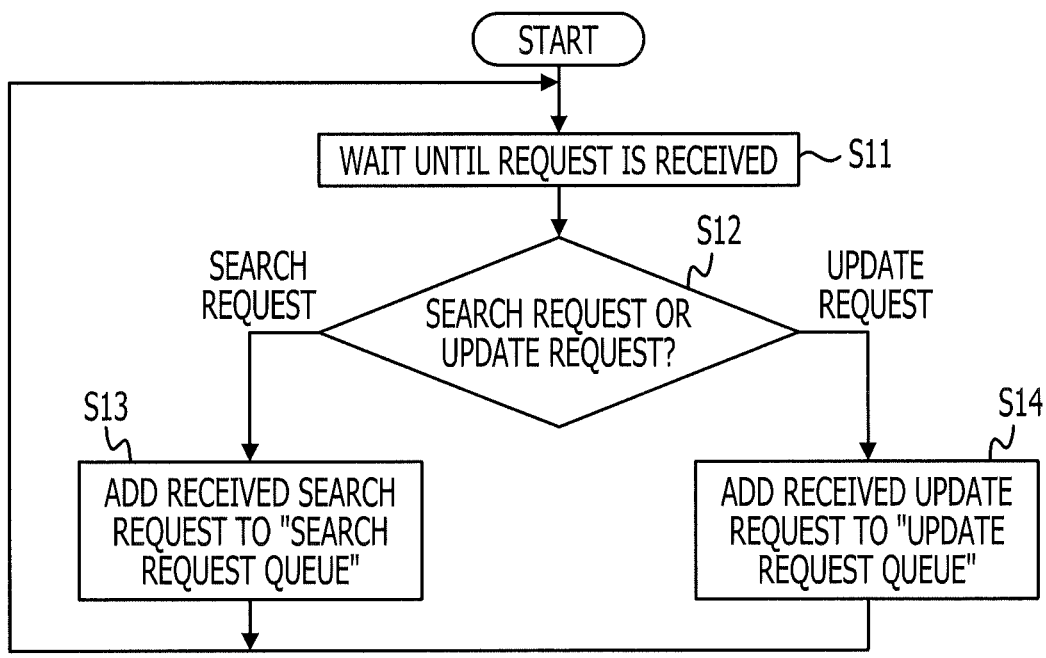
FIG. 7 is a flowchart illustrating a request receiving process.

FIG. 7 is a flowchart illustrating a request receiving process.

The request receiving unit 1 waits on standby until an execution request is received from the application 201 in the client apparatus 200 (S11). Upon receiving the execution request, the request receiving unit 1 determines whether the received execution request is a search request or an update request (S12). If the received execution request is a search request, the request receiving unit 1 adds the received search request to the search request queue 12 (S13), and repeats S11. If the received execution request is an update request, the request receiving unit 1 adds the received update request to the update request queue 11 (S14), and repeats S11. In other words, the request receiving unit 1 sorts the received execution requests into the search request and the update request, and then adds the search request and the update request to the search request queue 12 and the update request queue 11, respectively.

Optionally, the received execution request may be added to a single queue in the order of arrival without being sorted into the search request and the update request.

Figure 8:
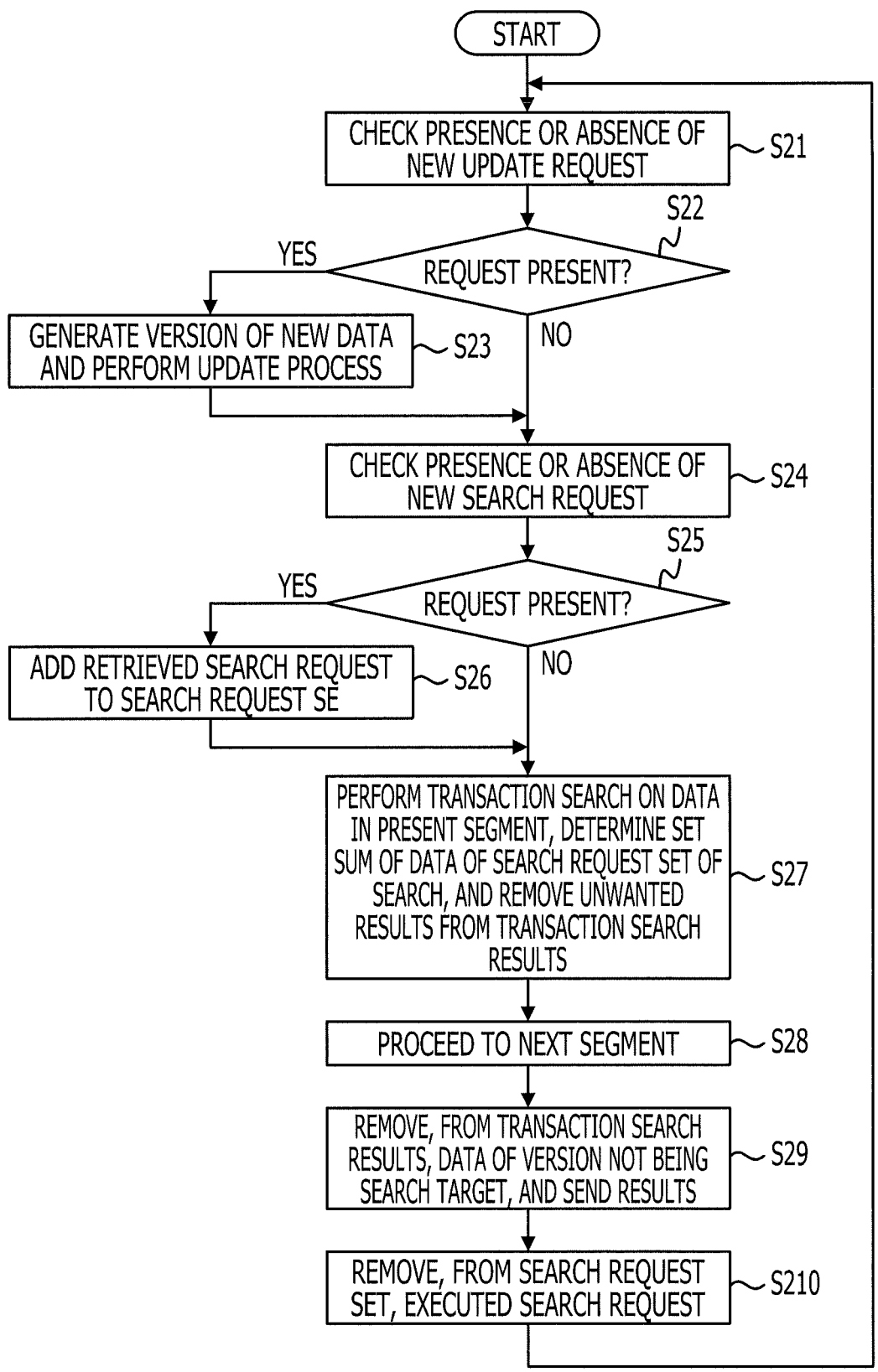
FIG. 8 is a flowchart illustrating an execution request process.

FIG. 8 is a flowchart illustrating an execution request process.

The update control unit 2 checks the update request queue 11 in the request receiving unit 1 (S21) to determine whether a new update request is present in the update request queue 11 (S22). If a new update request is present in the request receiving unit 1 (yes branch from S22), the updating unit 4 retrieves the new update request from the update request queue 11. The updating unit 4 generates a new data version in accordance with the retrieved new update request, and performs the update process on the old version data stored on the data storage unit 5 serving as the database (S23). If no new update request is present in the update request queue 11 (no branch from S22), the updating unit 4 skips S23.

The search control unit 3 checks the search request queue 12 in the request receiving unit 1 (S24) to determine whether a new search request is present in the search request queue 12 (S25). If a new search request is present (yes branch from S25), the search control unit 3 retrieves the new search request from the search request queue 12 and adds the retrieved search request to the search request set 31 (S26). If no new search request is present in the search request queue 12 (no branch from S25), the search control unit 3 skips S26.

The transaction searching unit 6 performs the transaction search process on the search request set over a segment as an present search target. The transaction searching unit 6 determines the set sum of data as search results (transaction search results) responsive to the search request set and removes unwanted search results from the determined data set sum (S27).

The search control unit 3 sets, as a search target segment, a next segment subsequent to the present segment (S28). The search control unit 3 then sends to the result sending unit 7 as search results a remainder arising from removing data of a version not being the search target from the transaction search process results (S29). The result sending unit 7 then sends the received search results to the application 201 in the client apparatus 200 as a requesting source. The search control unit 3 removes the search request having undergone the search on all the segments from the search request set 31 (S210), and starts over with S21 again.

Any of the operations in each of S21-S210 may be performed prior to another.

Figure 9:
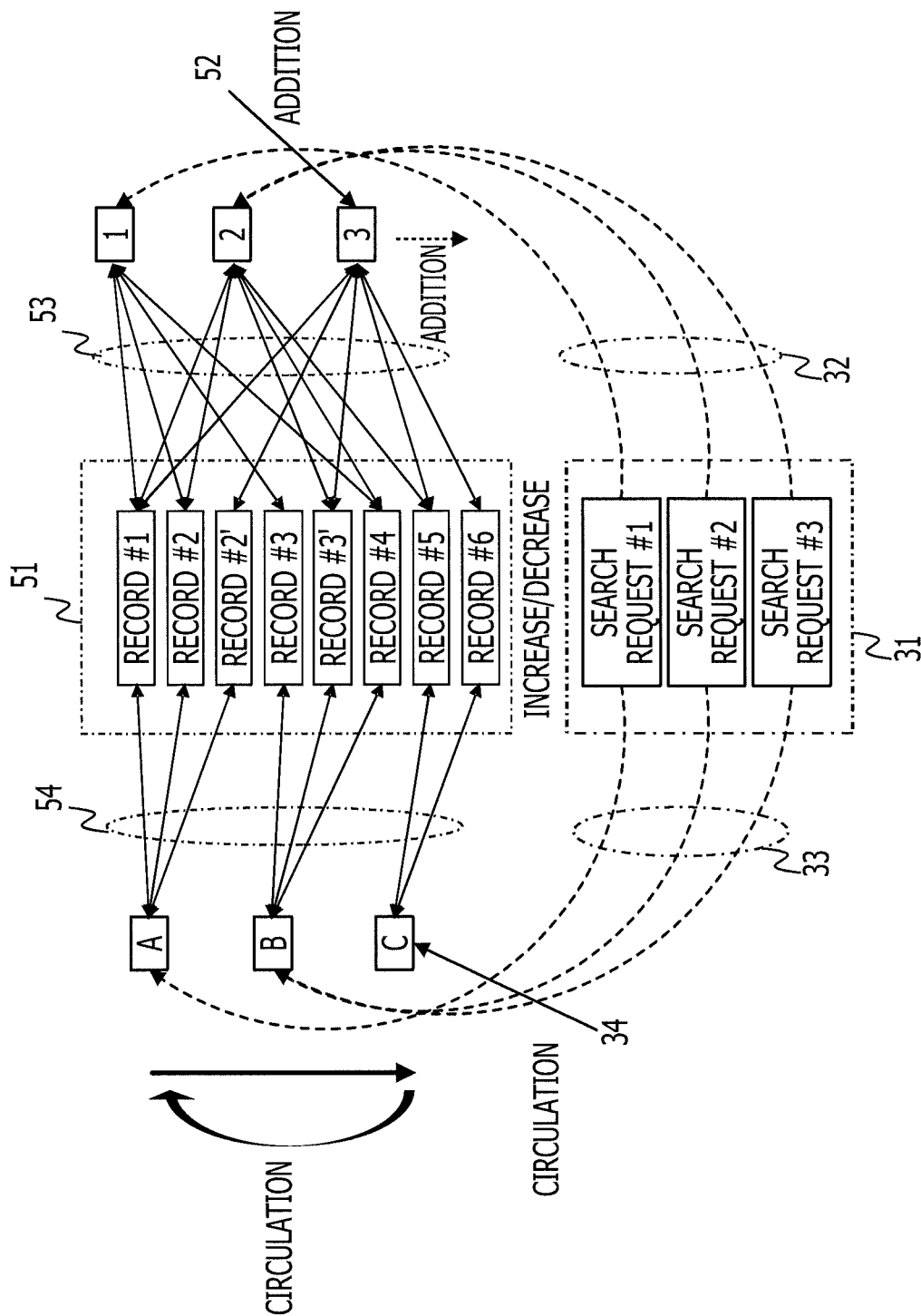
FIG. 9 illustrates the execution request process.

As illustrated in FIG. 9, the transaction searching unit 6 may perform the transaction search process in a cyclic fashion in the order of the segment A, the segment B, and the segment C in the flowchart of the execution request process of FIG. 8. The next transaction search execution segment information 34 is set to be B during the transaction search process of the segment A, is set to be C during the transaction search process of the segment B, and is set to be A during the transaction search process of the segment C. The next transaction search execution segment information 34 thus leads the execution of the transaction search process by one segment, and changes in a cyclic fashion in the predetermined order.

The version ID information 52 is added each time the update process is performed. The version ID to data mapping information 53 is also added each time the update process is performed.

The search request set 31 increases each time the search request is retrieved from the search request queue 12, and decreases each time the search responsive to the search request over all the segments is complete.

Figure 10:
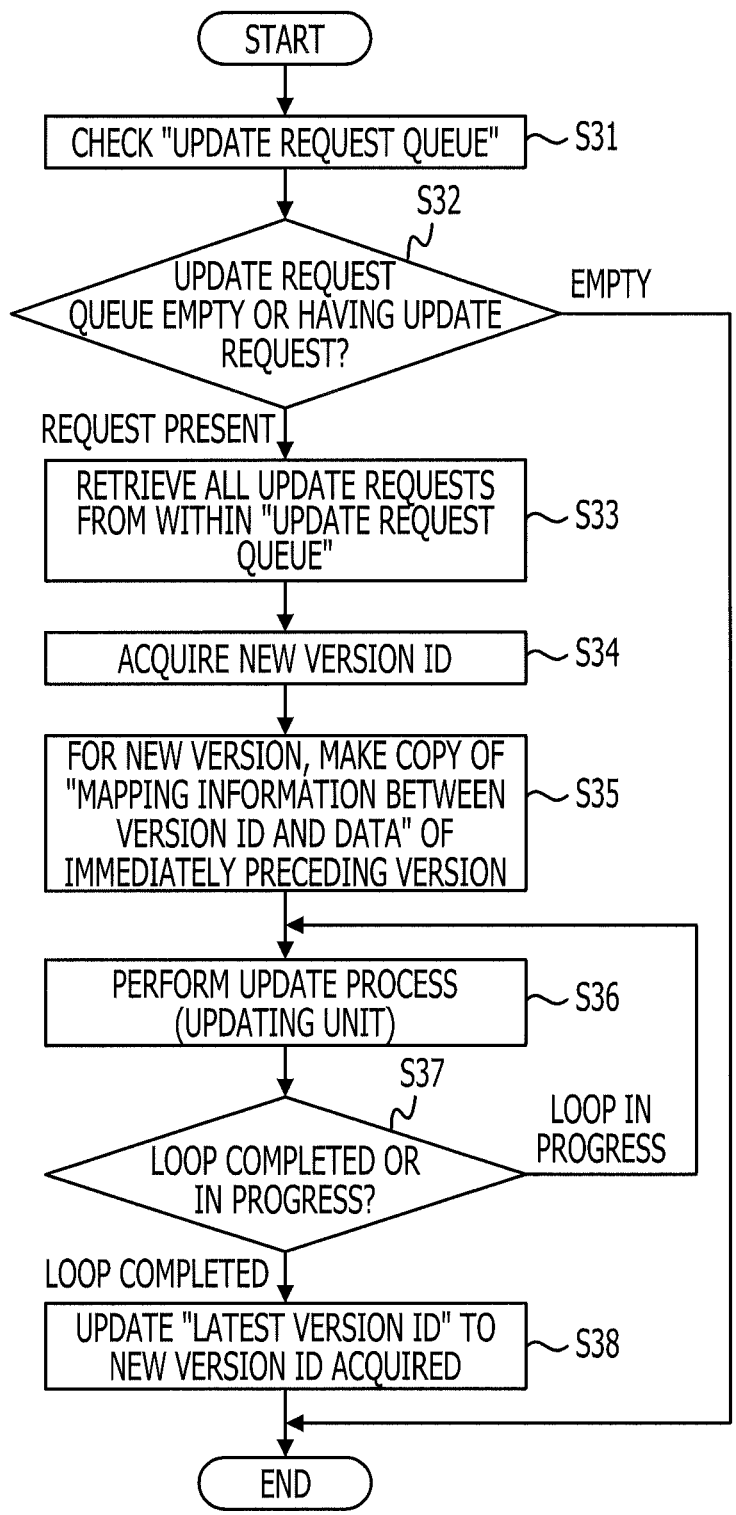
FIG. 10 is a flowchart illustrating an update request process.

FIG. 10 is a flowchart illustrating the update request process.

The update control unit 2 checks the update request queue 11 (S31) to determine whether the update request queue 11 includes a new update request or is empty (S32). S31 and S32 are respectively identical to S21 and S22 in FIG. 8, and are still illustrated in FIG. 10 to clarify a difference between FIG. 8 and FIG. 10. S33-S38 correspond to S23 in FIG. 8.

If a new update request is present in the update request queue 11, the updating unit 4 retrieves all the update requests present in the update request queue 11 (S33). The updating unit 4 acquires a new data version ID based on the present data version ID (S34). For example, the updating unit 4 references the version ID information 52, i.e., the present data version ID, and increments the referenced data version by +1. The updating unit 4 acquires the new data version ID. The updating unit 4 then generates "mapping information between the version ID and data" of the new version in accordance with the "mapping information between version ID and data" of the present version (S35). For example, the updating unit 4 makes a copy of the "mapping information between version ID and data" of the present version, and then substitutes the new version ID for the version ID in the copied "mapping information between version ID and data." The "mapping information between version ID and data" is generated.

After the update process of the storage data set 51 is performed (S36), the updating unit 4 determines whether a loop is complete or in progress (S37). If the loop is in progress, the updating unit 4 repeats S36. If the loop is complete, the updating unit 4 updates the version ID information 52, i.e., the "latest version ID" to the new data version ID acquired in S34 (S38). In S38, the updating unit 4 adds the "mapping information between version ID and data" of the new version generated in S35 to the version ID to data mapping information 53, i.e., the "mapping information between version ID and data."

If the update request queue 11 is empty in S32, S33 through S38 are skipped. In other words, the updating unit 4 performs no operations.

As illustrated in FIG. 10, a single version is generated for all the update requests retrieved from the update request queue 11. Optionally, different versions may be generated respectively for the plurality of update requests retrieved from the update request queue 11.

Figure 11:
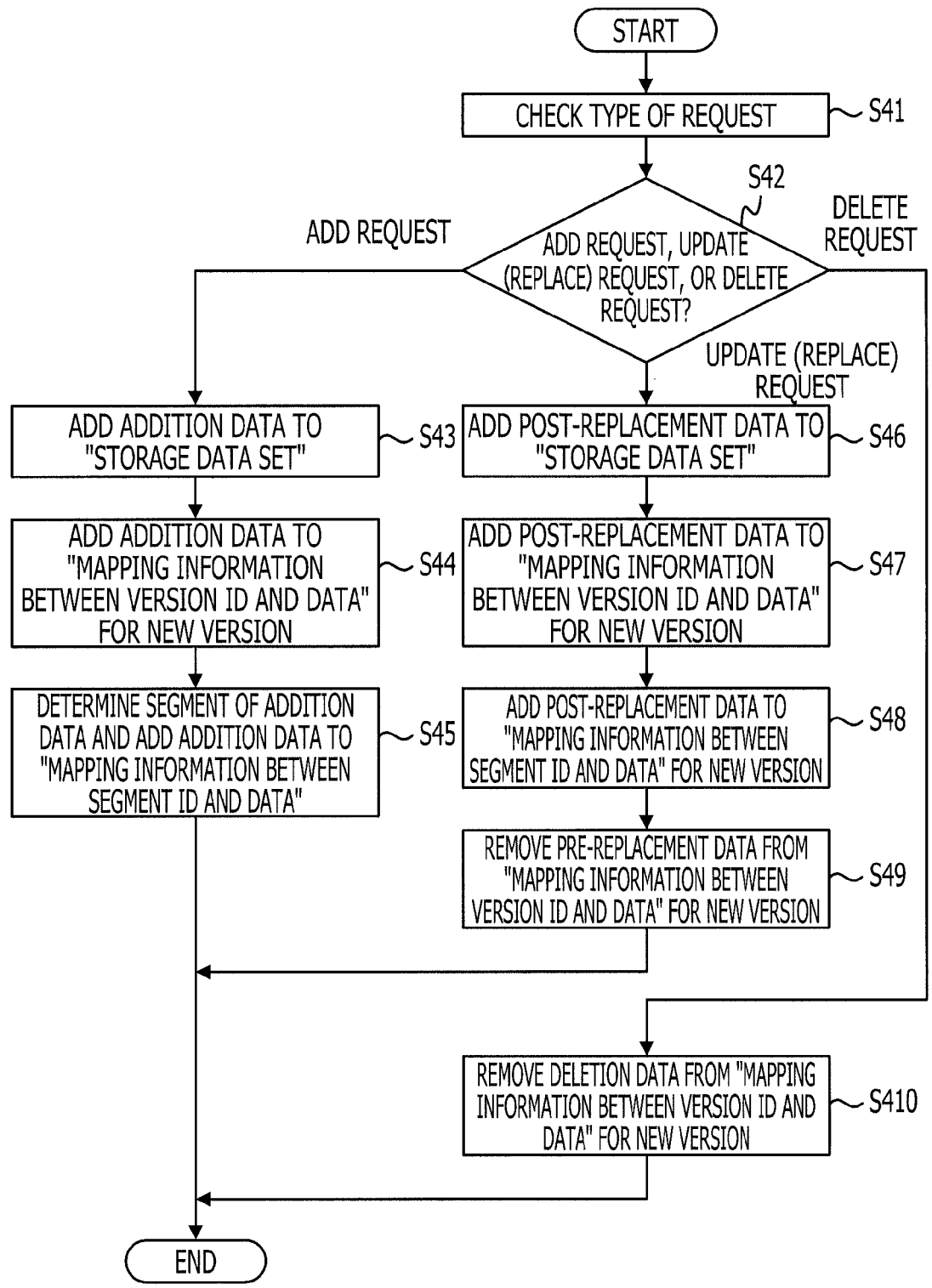
FIG. 11 is a flowchart illustrating an update execution process.

FIG. 11 is a flowchart illustrating an update execution process.

The updating unit 4 checks the type of update request (S41) to determine whether the update request is an add request, an update (replace) request, or a delete request (S42).

If the update request is an add request, the updating unit 4 generates new data, i.e., addition data in response to the add request, and adds the generated addition data to the storage data set 51, i.e., the "data set" (S43). The updating unit 4 then adds the version ID and data relating to the addition data to the "mapping information between version ID and data" of the new version (S44). The updating unit 4 determines the segment ID of the addition data, and adds the segment ID and data related to the addition data to the "mapping information between segment ID and data" (S45).

If the request is an update request, the updating unit 4 generates in response to the update request a new version of data, i.e., post-replacement data, and adds the generated post-replacement data to the storage data set 51, namely, the "data set" (S46). The updating unit 4 adds the version ID and data relating to the post-replacement data to the "mapping information between version ID and data" of the new version (S47). The updating unit 4 adds the segment ID and data relating to the post-replacement data to the "mapping information between segment ID and data" (S48). The updating unit 4 removes pre-replacement data from the "mapping information between version ID and data" of the new version (S49).

If the update request is a delete request, the updating unit 4 removes deletion data from the "mapping information between version ID and data" for a new version in response to the delete request (S410).

If the update request is an add request in FIG. 11, a segment to be added is determined based on an attribute of the added data. For example, as described with reference to FIG. 5, the record #3' arises from updating the record #3 belonging to the segment B and belongs to the segment B. The record #5 is newly added data, and is set to belong to the segment C. Optionally, the addition segments may be changed in the order of data addition, for example, in the order of the segment A, the segment B, and the segment C, for example. In such a case, the number of data elements belonging to one segment may be predetermined.

Figure 12:
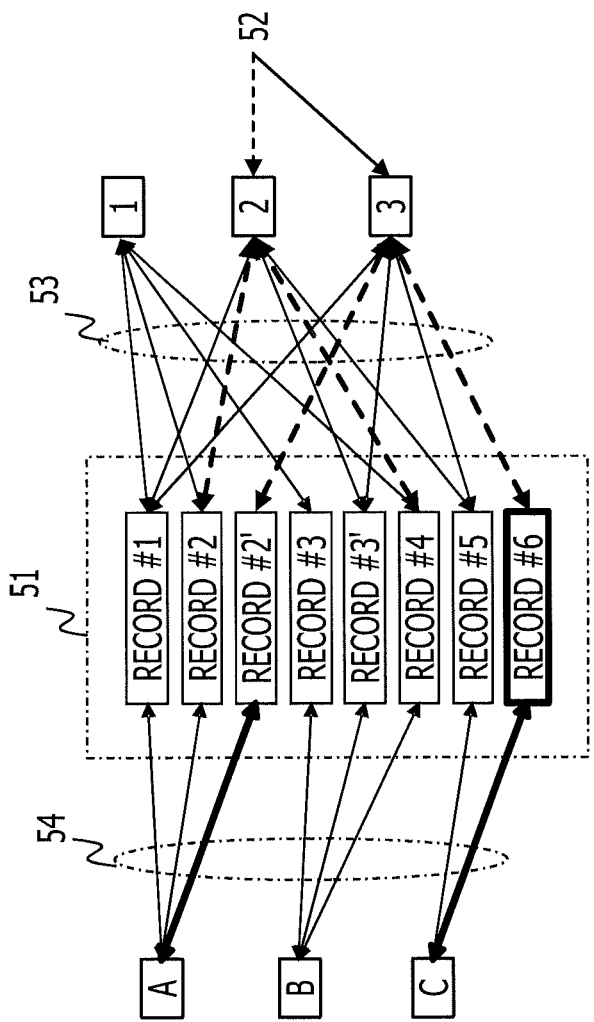
FIG. 12 illustrates the update request process.

As illustrated in FIG. 12, the mapping information between version ID and data (record) is generated in view of the mapping information between a version ID (for example, 2) immediately prior to a new version ID (for example, 3) and data in the update execution process of FIG. 11.

As illustrated in FIG. 12, the version ID to data mapping information 53 maps the present version ID "2" to records #1, #2, #3', #4, and #5. This state is the state of the version ID "2" illustrated in FIG. 5. The new version ID is "3." the mapping between the new version ID "3" and data (record) is generated in view of the mapping information between the version ID "2" and data. The state of the new version ID "3" may now be the state illustrated in FIG. 5.

By making a copy of the mapping information between the version ID "2" and data, the new version ID "3" is mapped to the records #1, #2, #3', #4, and #5. Since the record #2' is substituted for the record #2 in response to the update request of the record #2, mapping with the record #2 is deleted. Mapping with the record #2' is added. The mapping with the record #4 is deleted in response to the delete request of the record #4, and the mapping with the record #6 is added in response to the add request of the record #6.

Figure 13:
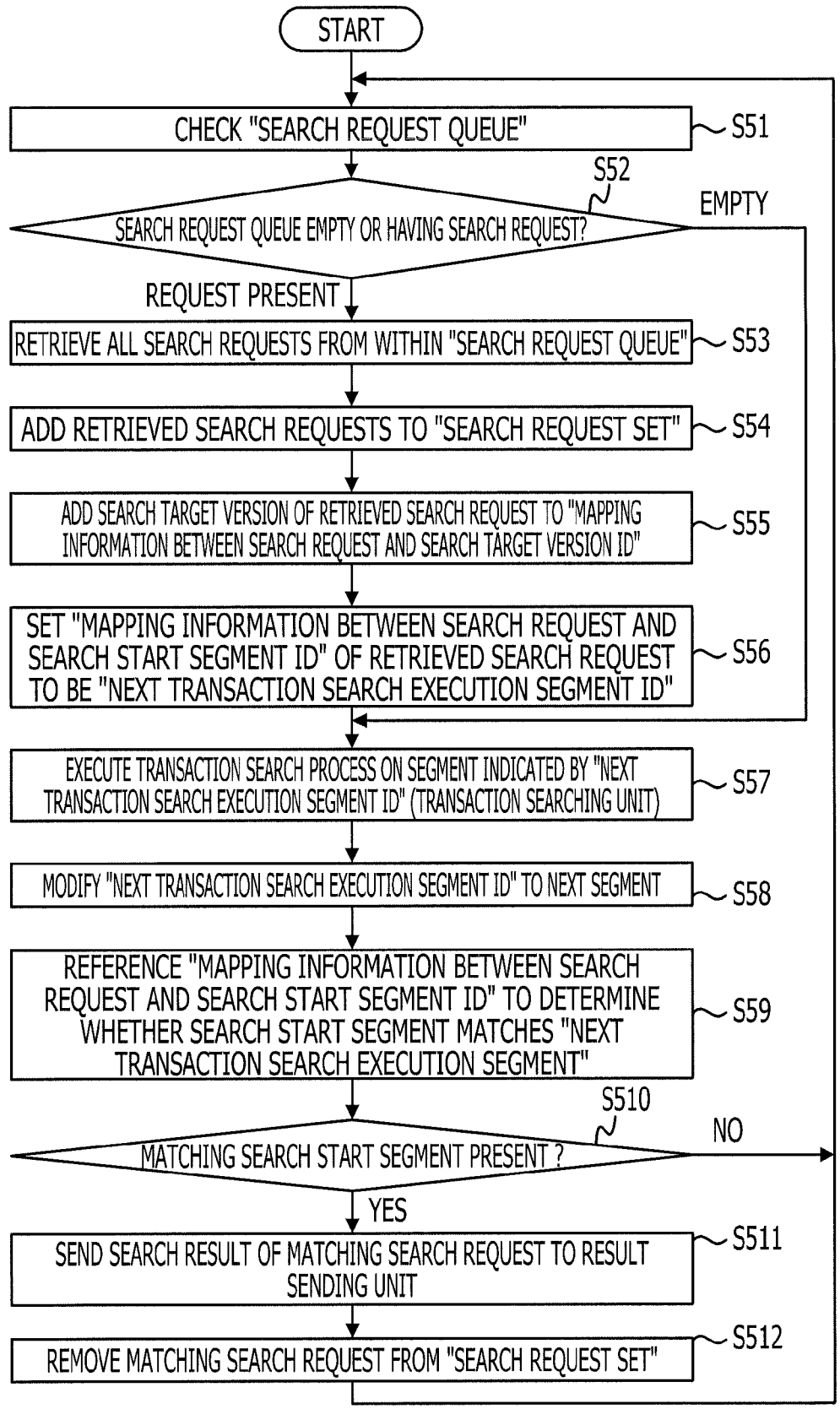
FIG. 13 is a flowchart illustrating a search request process.

FIG. 13 is a flowchart illustrating a search request process.

The search control unit 3 checks the search request queue 12 in the request receiving unit 1 (S51) to determine whether the search request queue 12 includes a new search request or is empty (S52). S51 and S52 are respectively identical to S24 and S25 in FIG. 8, and are still illustrated in FIG. 13 to clarify a difference between FIG. 8 and FIG. 13. S53-S512 correspond to S26-S210 in FIG. 8.

If the search request queue 12 includes a new search request, a start process of the execution of the search request is executed. More specifically, the search control unit 3 retrieves all the search requests present in the search request queue 12 (S53), and adds the retrieved search requests to the search request set 31, namely, the search request output (S54). The search control unit 3 adds the search target version of the retrieved search request to the search request to version ID mapping information 32, namely, the "mapping information between search request and the search target data version ID" (S55), and sets the "mapping information between search request and search start segment ID" of the retrieved search request to be a "next transaction search execution segment ID" (S56).

If the search request queue 12 is empty in S52, the search control unit 3 skips S53-S56.

The transaction searching unit 6 performs the transaction search process over a segment indicated by the "next transaction search execution segment ID" (S57). The transaction search process is performed over one segment regardless of whether the search request queue 12 includes a new search request.

The search control unit 3 modifies the "next transaction search execution segment ID" to a next segment (S58). The search control unit 3 references the "mapping information between search request and search start segment ID" to determine whether a search start segment matching the "next transaction search execution segment" is present (S59). The search control unit 3 determines whether a search start segment matching the "next transaction search execution segment" is present (S510). If a search start segment matching the "next transaction search execution segment" is not present, the search control unit 3 repeats S51.

If a search start segment matching the "next transaction search execution segment" is present, an end process of the execution of the search request is performed. In this way, the processes of the search control unit 3 include the start process of the execution of the search request, the transaction search process, and the end process of the execution of the search request. More specifically, the search control unit 3 sends the search results responsive to the matching search request to the result sending unit 7 (S511). The search control unit 3 removes the matching search request from the search request set 31 (S512), and repeats S51. In S512, the search control unit 3 removes information representing the mapping information between the matching search request and version ID from the search request to version ID mapping information 32, and removes information representing the mapping information between the matching search request and segment ID from the search request to segment ID mapping information 33.

In S511, the search results are together sent to the result sending unit 7. Optionally, each time the transaction search process is complete for one segment, the search results over the one segment may be sent to the result sending unit 7.

Figure 14:
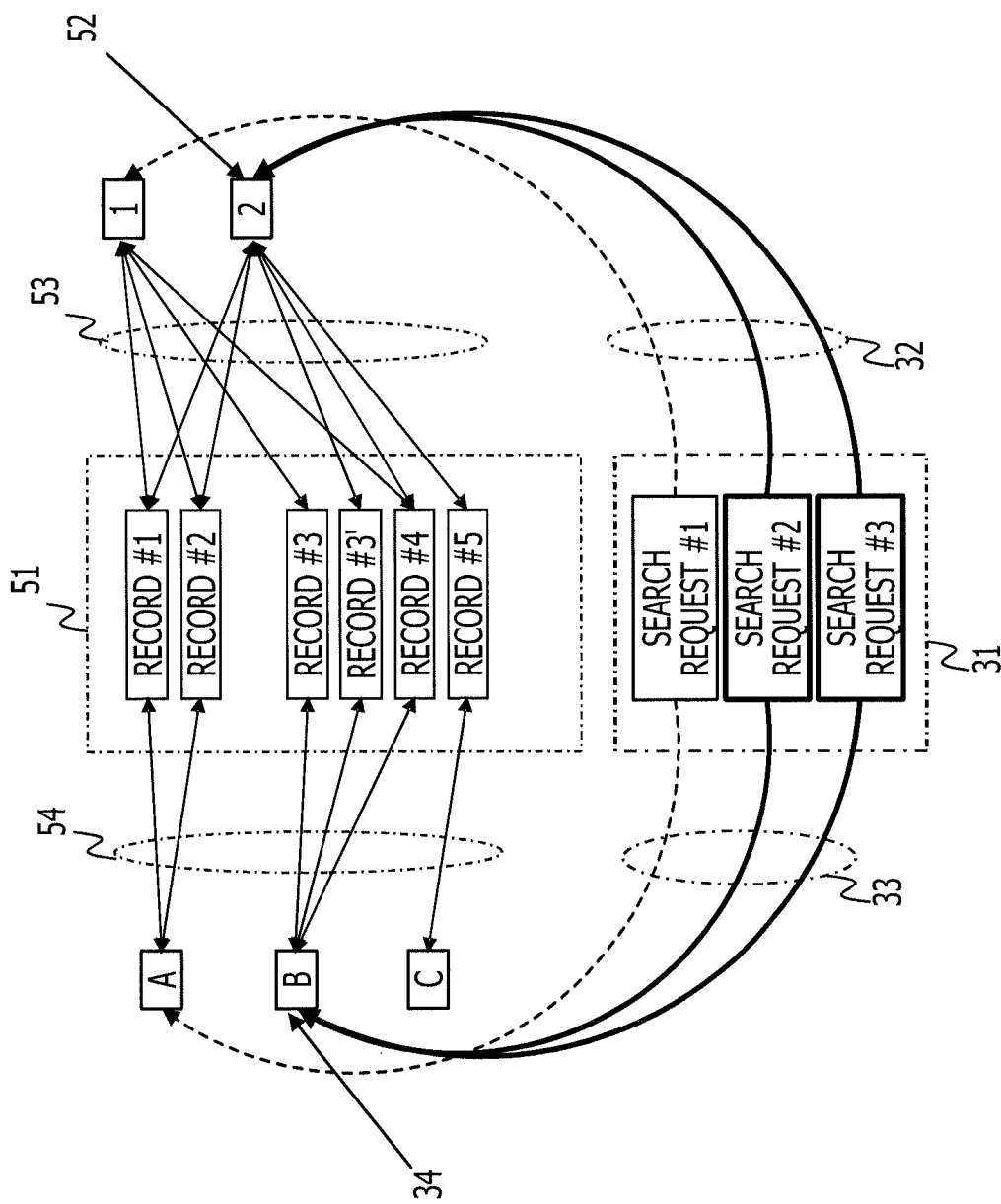
FIG. 14 illustrates the search request process.

As illustrated in FIG. 14, the version ID of the latest data indicated by the latest version ID information is "2" at a time point in the segment B as the "next transaction search execution segment" indicated by the next transaction search execution segment information 34 in the search request process of FIG. 13. In other words, the record #2' and the record #6 as the data of the version ID "3" are not present. At a time point in the segment B as the "next transaction search execution segment," the record #4 is not deleted in the data of the version ID "3."

With the "next transaction search execution segment" being at a time point in the segment B, in other words, with the transaction search process over the segment A in progress, the search request #2 and the search request #3 arrive at the search request queue 12. The search request #2 and the search request #3 are added to the search request set 31 from the transaction search process over the segment B subsequent to the end of the transaction search process over the segment A.

Figure 15:
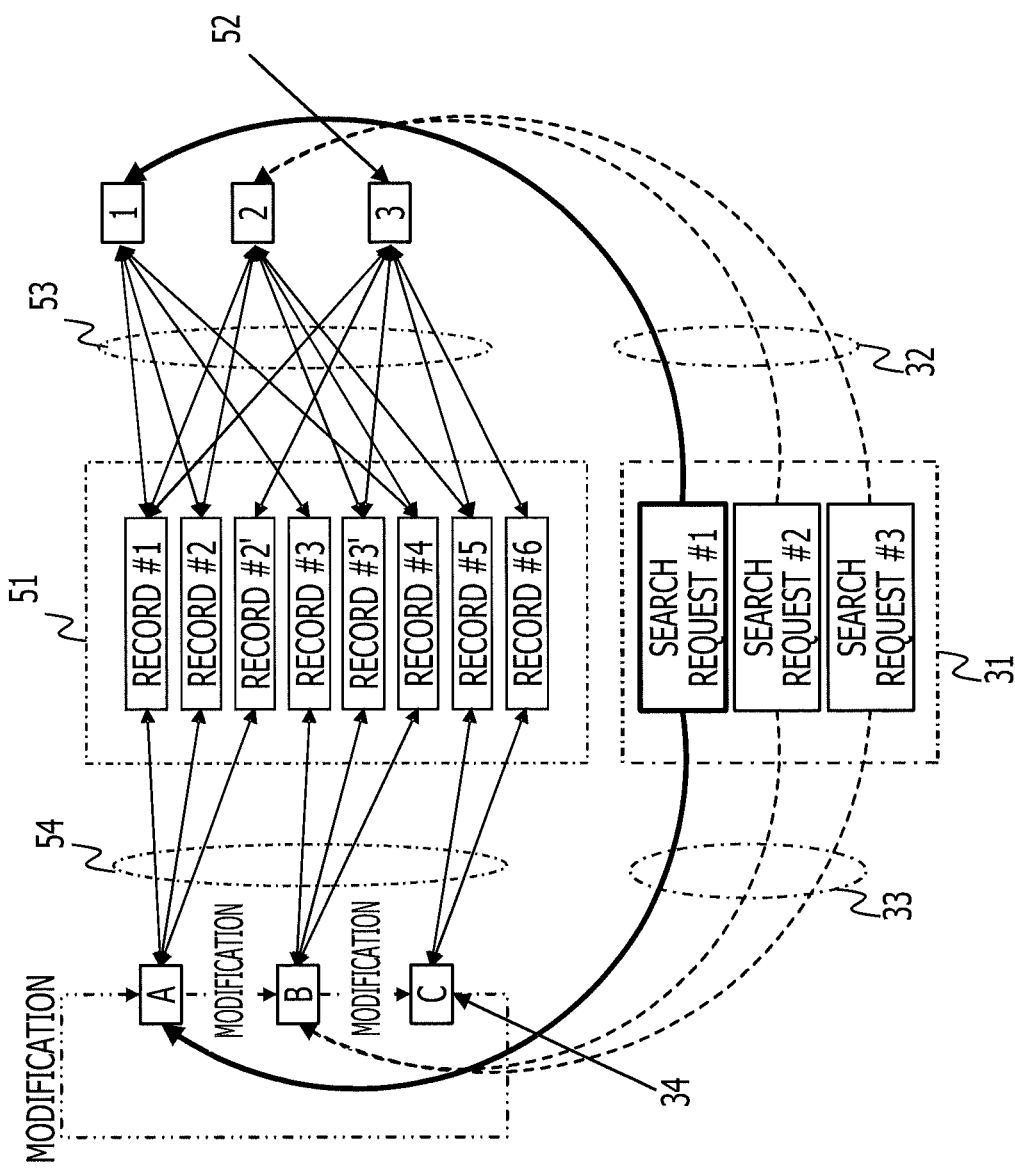
FIG. 15 illustrates the search request process.

With the transaction search process over the segment A in progress, the update request of the record #2', the add request of the record #6, and the delete request of the record #4 arrive at the update request queue 11. As illustrated in FIG. 15, the data of the version ID "3" are generated subsequent to the end of the transaction search process over the segment A, and prior to the start of the transaction search process over the segment B. The record #2' is updated, the record #6 is added, and the record #4 is deleted.

As illustrated in FIG. 15, the "next transaction search execution segment" is modified to the segment C, and the transaction search process over the segment B starts. As illustrated in FIG. 15, the "next transaction search execution segment" is modified in the order of from the segment A, the segment B, and the segment C, and this process is repeated. The search request #1 with the search starting with the segment A is circulated. When the "next transaction search execution segment" becomes the segment A again, the search request #1 is executed all over the segment A through the segment C. The search results are sent to the result sending unit 7, and the search request #1 is removed from the search request set 31.

Figure 16:
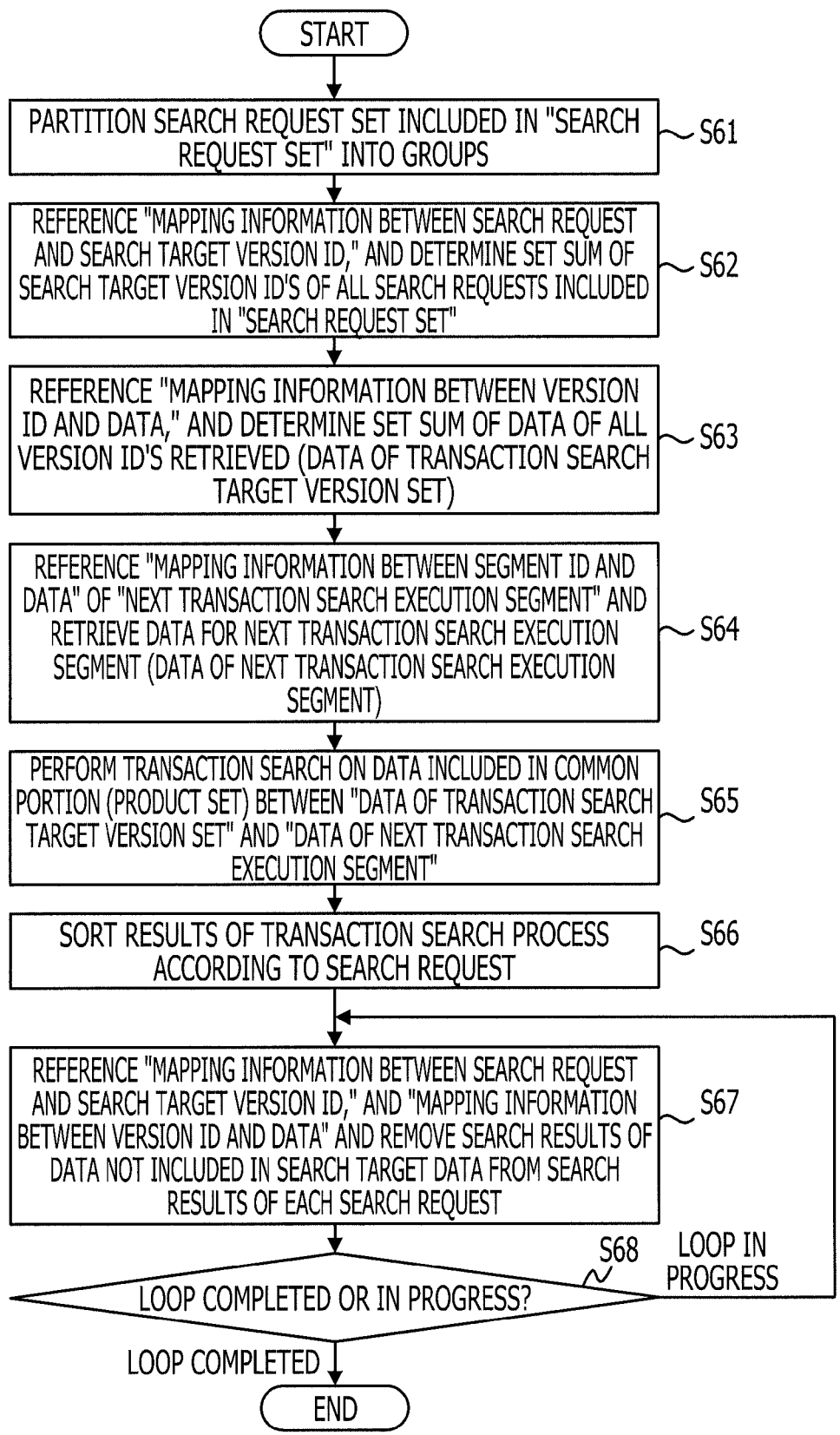
FIG. 16 is a flowchart illustrating a transaction search execution process.

FIG. 16 is a flowchart illustrating a transaction search execution process.

The transaction searching unit 6 partitions the plurality of search requests included in the search request set 31 into groups, in other words, generates a search expression for the transaction search (S61). The transaction searching unit 6 references the "mapping information between search request and search target data version ID" to determine the set sum of version IDs of data as a search target of all the search requests included in the search request set 31 (S62). The transaction searching unit 6 references the "mapping information between version ID and data set" to determine the sum of data corresponding to all the version IDs retrieved in S62 (S63). The transaction searching unit 6 references the "mapping information between segment ID and data set" of the "next transaction search execution segment" to retrieve data of the next transaction search execution segment (S64).

The transaction searching unit 6 performs the transaction search on data included in a common portion (product set) between "data of the transaction search target version set" and "data of the next transaction search execution segment" (S65).

The transaction searching unit 6 sorts the results of the transaction search process on a per search request basis (S66). The transaction searching unit 6 references the "mapping information between search request and search target data version ID" and the "mapping information between version ID and data set" and removes, from the search results of each search request, search results of data not included in the search target data set (S67). The transaction searching unit 6 then determines whether the loop is complete or in progress (S68). If the loop is in progress, the transaction searching unit 6 repeats S67. If the loop is complete, the transaction searching unit 6 ends the process.

In the same manner as in FIG. 13, the transaction search execution process of FIG. 16 includes three processes: a pre-process, a transaction search process, and a post-process. The pre-process, including S61-S64, is performed to determine a data set, as a target of the transaction search, which serves as an input to the transaction search process such that no missing portion takes place in the search results. The transaction search process, corresponding to S65, is performed on the data set as the target of the transaction search. The post-process, including S66-S68, is performed to remove, from the transaction search results, unwanted search results in view of each search request.

As illustrated in FIG. 16, the pre-process, the transaction search process, and the post-process are performed. Alternatively, the pre-process, the transaction search process, and the post-process may be executed in separate processes or threads in parallel.

The pre-process is described below with reference to FIG. 4. If the transaction search process is performed over the segment B as illustrated in FIG. 4, the pre-process is performed as described below.

The set sum of the data version IDs of data as a search target responsive to the search request included in the search request set 31 is {version ID "1" and version ID "2"} (S62). The set sum of data corresponding to the "version ID "1" and the version ID "2" is {record #1, record #2, record #3, record #3', record #4, and record #5} (S63). A "set sum of the data of the next transaction search execution segment" of the segment B is {record #3, record #3', and record #4} (S64). A common portion of the two set sums is {record #3, record #3', and record #4}. The transaction search process is performed on this common portion.

As the pre-process, the post-process is also described with reference to FIG. 4. As illustrated in FIG. 4, the transaction search may be performed on the segment B subsequent to the pre-process. The post-process is performed as described below.

In the results of the transaction search, the record #3' is data not included in the search target version 1 of the search request #1. The record #3' is removed from the search results to be returned to the search request #1. Similarly, as for the search requests #2 and #3, a record unwanted for each search request is removed from the search results to be returned to the respective search request.

Whether the data (record) included in the search results through the transaction search are used for the search request is determined as described below.

The search results of each data element may be associated with a list of version IDs including the data element. The search results of the record #1 of FIG. 4 are associated with information {version ID "1," version ID "2," and version ID "3"}, and the search results of the record #2 are associated with information {version ID "1," and version ID "2"}. If the version ID is represented by number, the search results of each data element may be associated with a "range of version ID" such as "from version ID "1" to version ID "3.""

The determination of the version with respect to the search results may be handled as part of query (search expression) of the search request. Whether the search results fall within the version as the search target may be added as AND condition (gating) to the query of the original search request. For example, the query of the search request #2 of FIG. 4 may be added to the query as "(original search expression of the search request #2) AND (version ID "2")." With this arrangement, the unwanted search result is removed concurrently at the transaction search.

Another example of the search request process is described with reference to FIGS. 17-19.

In the search request process of FIG. 13, the version of the data as the search target of the search request is transmitted from the application 201 in the client apparatus 200, and the transaction searching unit 6 performs the search process on the received version as the search target. The version of the data when the search request arrives at the search request queue 12 may be a version of the search target of the search request.

In such a case, the latest version is typically searched in response to the search request. The data including only an old version may be deleted. At the moment data of a new version is generated rendering the latest version old, the search process is still performed on the old version. The latest version is not deleted at the moment the latest version becomes old. In other words, the old version is not deleted until the delete request is executed. If the search process starting after the updating of the old version to the new version is performed on all the data, i.e., is circulated through all the segments, the data of the old version are the search target no longer thereafter.

Figure 17:
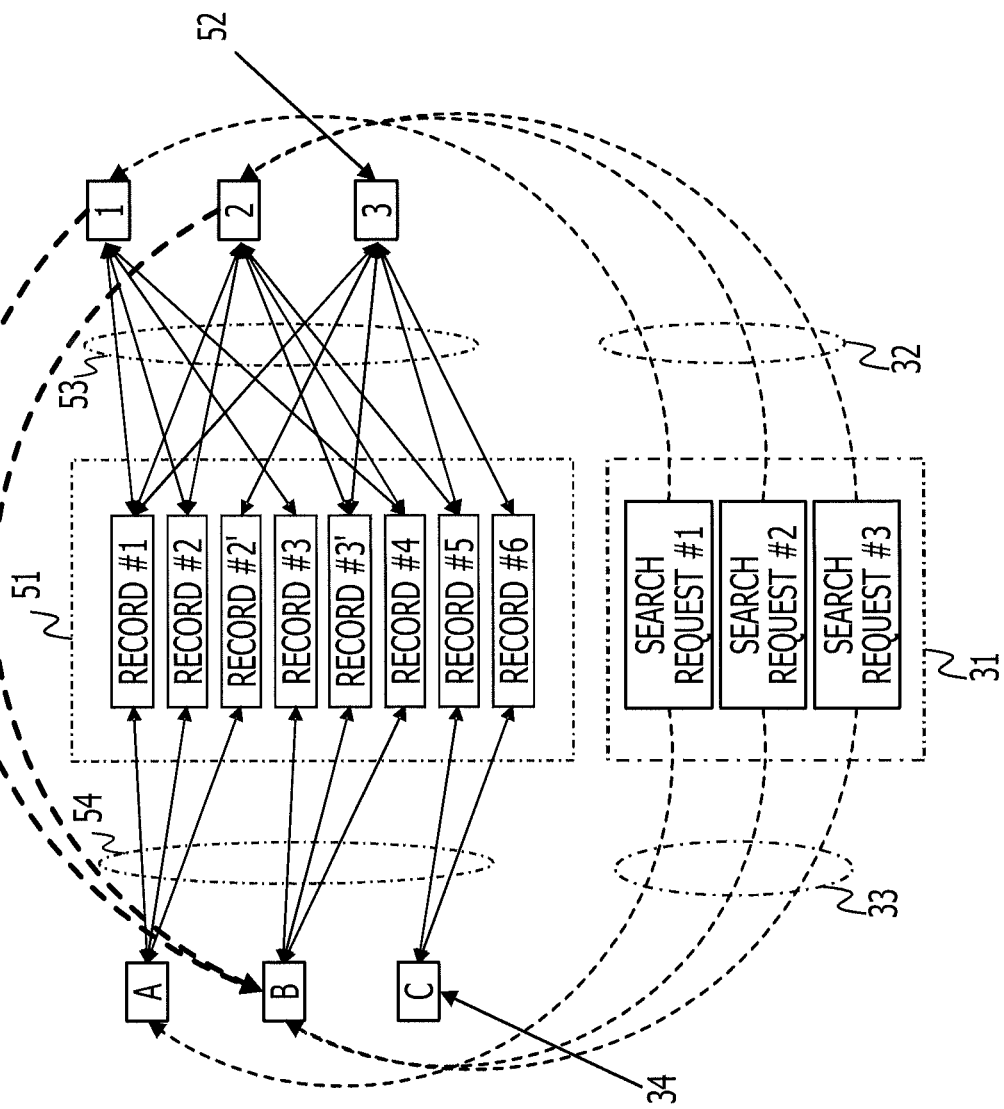
FIG. 17 illustrates another example of the search request process.

As illustrated in FIG. 17, the search control unit 3 stores version ID to segment ID mapping information 35 as control information for the transaction search. The version ID to segment ID mapping information 35 is stored on a version ID to segment ID mapping information storage unit of the search control unit 3. The version ID to segment ID mapping information 35 is information representing "mapping information between version ID and segment ID of the search end segment" and indicates the mapping information between the version of the data and the segment ID on which the data of that version is searched last.

The version ID to segment ID mapping information 35 is stored in a version ID to segment ID mapping table in practice. The version ID to segment ID mapping table stores in a mapped state the "version ID" and the segment ID on which the data of the version is searched last.

As illustrated in FIG. 17, a broken-line segment serving as part of the version ID to segment ID mapping information 35 links the version ID "1" to the segment ID "B" and the version ID "2" to the segment ID "B." In this way, the data of the version ID "1" and the version ID "2" finally become the search target over the segment "B."

Figure 18:
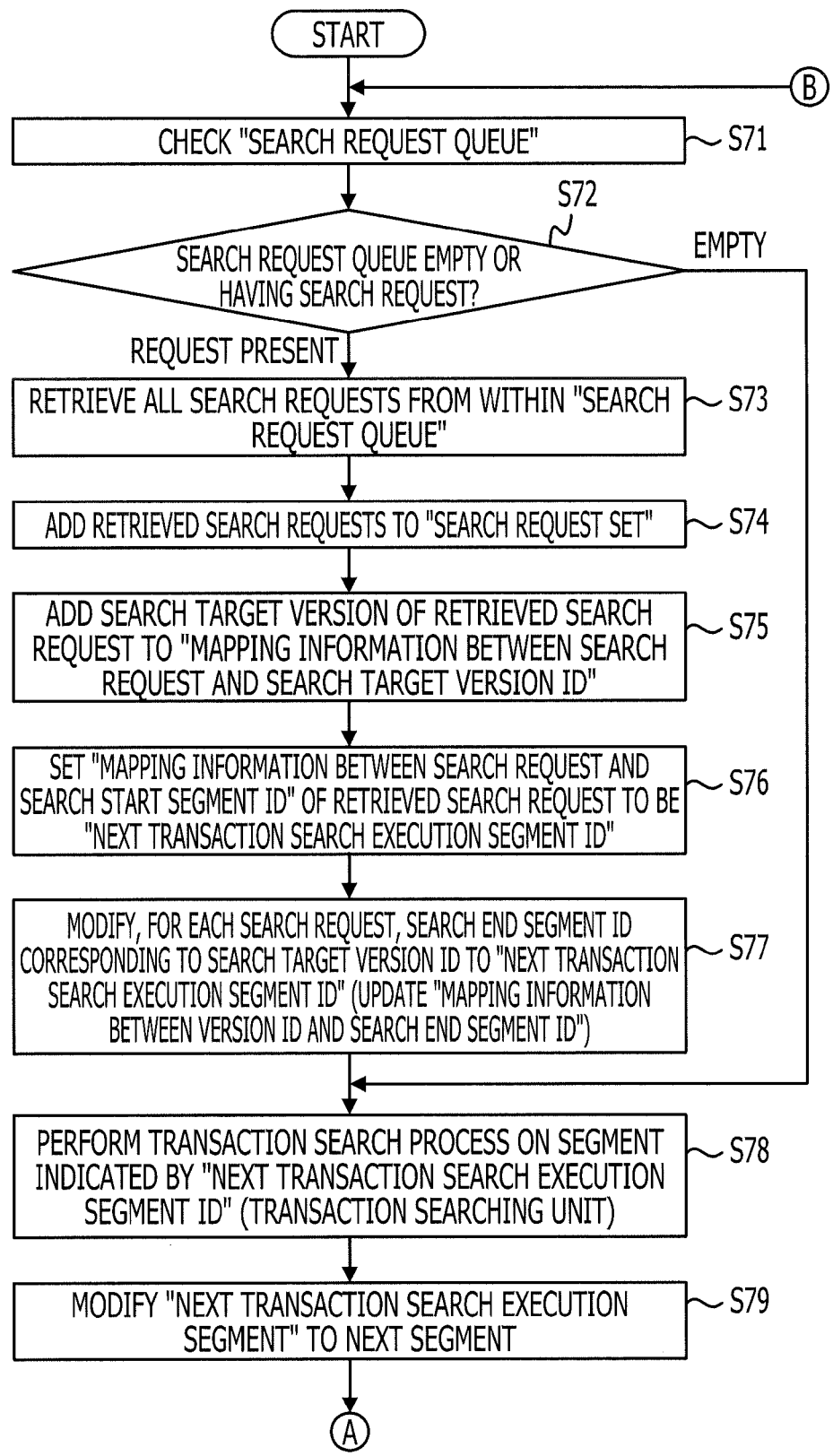
FIG. 18 is a flowchart illustrating another example of the search request process.
Figure 19:
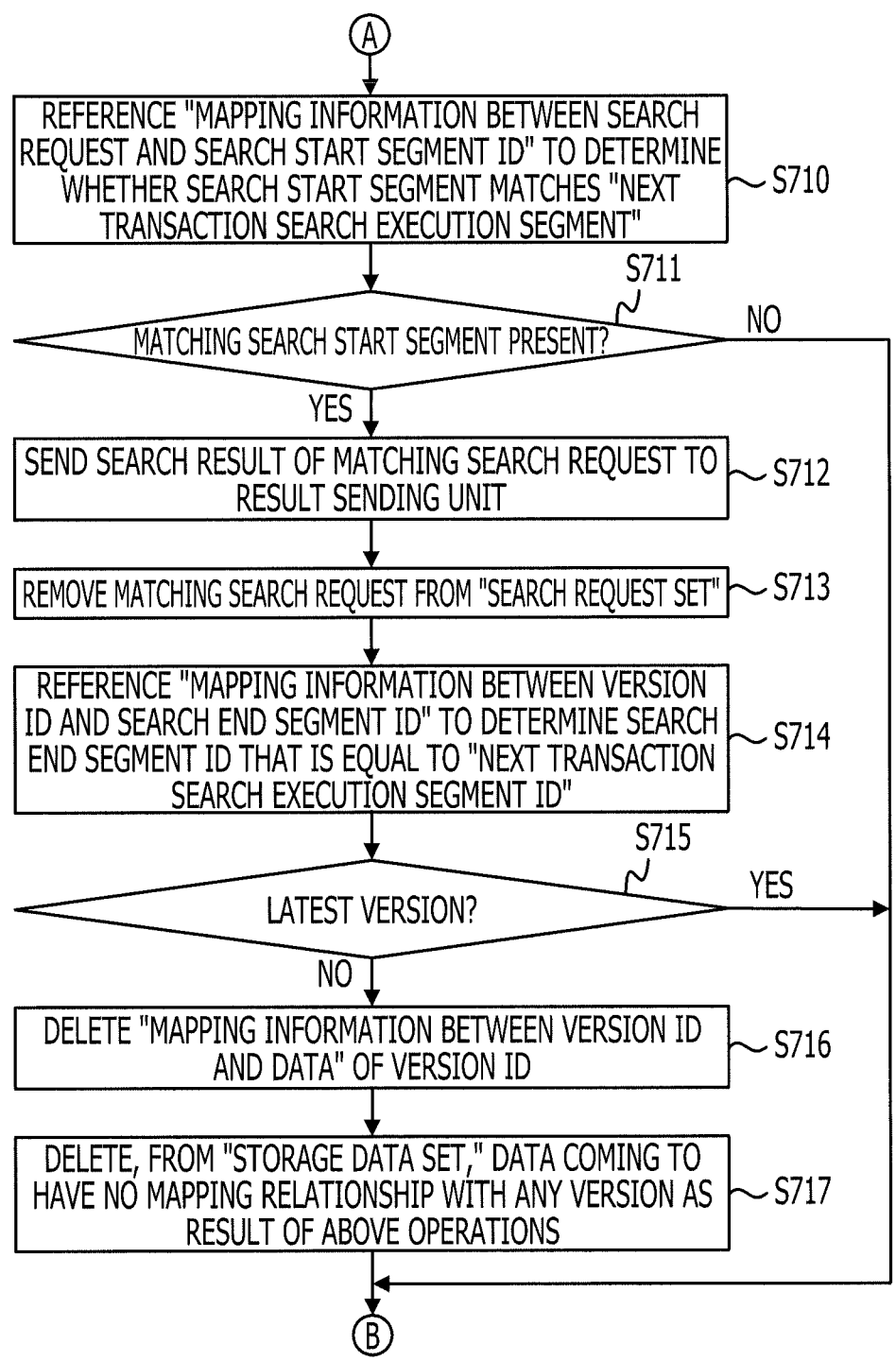
FIG. 19 is a flowchart illustrating another example of the search request process.

FIGS. 18 and 19 in combination are a flowchart illustrating the search request process.

The search control unit 3 performs S71-S76 in the same manner as S51-S56 of FIG. 13. The search control unit 3 checks the search request queue 12 in the request receiving unit 1 (S71) to determine whether the search request queue 12 includes a new search request (S72). If the search request queue 12 includes a new search request, the search control unit 3 retrieves all the search requests from the search request queue 12 (S73). The search control unit 3 adds the retrieved search requests to the search request set 31 (S74), adds the search target version of the retrieved search request to the search request to version ID mapping information 32 (S75), and sets the "mapping information between search request and search start segment ID" of the retrieved search request to be a "next transaction search execution segment ID" (S76).

The search control unit 3 hereinafter sets the "mapping information between search request and search start segment ID" of each retrieved search request, namely, the search end segment ID corresponding to the version ID of the data as the search target to be a "next transaction search execution segment ID" (S77).

If the search request queue 12 is empty in S72, the search control unit 3 skips S73-S77.

In the same manner as in S57 of FIG. 13, the transaction searching unit 6 performs the transaction search process on the segment indicated by the "next transaction search execution segment ID" (S78).

In the same manner as in S58-S512 of FIG. 13, the search control unit 3 performs S79-S713. In other words, the search control unit 3 modifies the "next transaction search execution segment" to a next segment (S79), checks whether any search start segment matches the "next transaction search execution segment" (S710), and determines whether a search start segment matching the "next transaction search execution segment" is present (S711). If no search start segment matching the "next transaction search execution segment" is present, the search control unit 3 starts over with S71 again. If a search start segment matching the "next transaction search execution segment" is present, the search control unit 3 sends the search results of the matching search request to the result sending unit 7 (S712), and removes the matching search request from the search request set 31 (S713).

The search control unit 3 references the "mapping information between version ID and search end segment ID" to determine a version ID of the search end segment ID equal to the "next transaction search execution segment ID" (S714), and determines whether the determined version ID is the latest version (S715).

If the determined version ID is the latest version (yes branch from S715), the search control unit 3 starts over with S71 again. If the determined version ID is the latest version, the data of the version ID, even with the search process thereof completed, is not deleted. This is because the data of the version ID as the latest version becomes the search target of a new search request expected to be issued later.

If the determined version ID is not the latest version (no branch from S715), the search control unit 3 deletes the "mapping information between version ID and data set" of the determined version ID (S716). The search control unit 3 further deletes from the storage data set 51 the record of the data becoming unmatched with any of the version IDs as a result of the above process (S717). The search control unit 3 then starts over with S71 again.

Through the above process, particularly, S77, S714-S717, the "mapping information between version ID and search end segment ID" is overwritten each time the search of the version ID starts, and then the segment ID is set. The segment at the start of the search means the segment at the end of the search. The set segment ID indicates the timing of the end of the search. Since the "mapping information between version ID and search end segment ID" is overwritten each time the search of the version ID starts, the segment ID at the end of the latest search of the version ID is set. The data of a given version are deleted immediately when the search of the data is complete. The storage data set 51 is efficiently used.

Information of a series of processes (information of the search request) may be stored on each application 201 of the client apparatus 200 in the system, and the version at the start of the series of processes may be set to be a search target. Since the search request is not necessarily executed on the latest version, the latest version is not deleted at the moment the latest version becomes old. The version of the latest data at the moment of the arrival of the search request at the search request queue 12 is set to be the version of the search target. The process illustrated in FIGS. 17-19 may be applicable in this case as well.

Yet another example of the search request process is described. FIGS. 20-25 illustrate the other example of the search request process.

In the embodiment illustrated in FIG. 13, the search request having arrived at the search request queue 12 is directly added to the search request set 31. Alternatively, however, it may be determined whether to add the search request having newly arrived at the search request queue 12 to the search request set 31. If a predetermined criterion is satisfied, the new search request may be added to the search request set 31.

The predetermined criteria may include a "cost C" and a "benefit B" described below. The cost C for adding to the search request set 31 the search request to search the new version is time to search for data included only in the new version. As will be described below with reference to FIG. 21, unwanted data are searched for if the transaction search process is performed on a plurality of versions. The benefit B from adding to the search request set 31 the search request to search the new version is a reduction in waiting time of the search request to be added.

If the benefit B is above the cost C, the search request to search the new version is added to the search request set 31. The average search performance of the searching apparatus 100 is generally increased. If the benefit B is equal to or below the cost C, the search request to search the new version is not added to the search request set 31. A drop in the average search performance of the searching apparatus 100 is generally controlled.

The cost C and the benefit B are calculated when the search is performed with the search target of the search request being the latest version at the start of the search. It is here assumed that the update requests and the search requests respectively arrive at the update request queue 11 and the search request queue 12 at regular intervals, that one data element is replaced with another data element in response to the update request, and that a total number of data elements remain unchanged.

Figure 20:
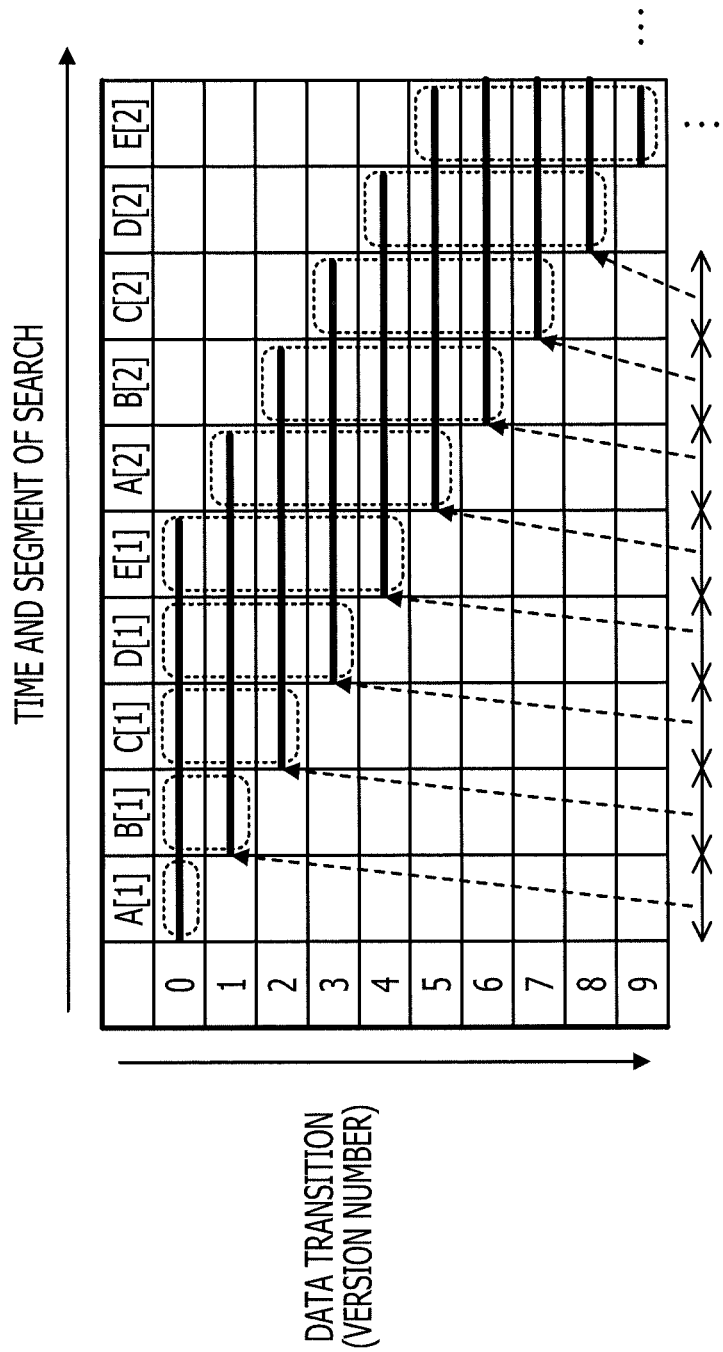
FIG. 20 illustrates another example of the search request process.

As illustrated in FIG. 20, the data are partitioned into segment "A" to segment "E." The segments "A" through "E" as the search target are transaction searched repeatedly in that order. A[1] represents the transaction search of a first-round segment "A," and A[2] represents the transaction search of a second-round segment "A." The same is true of the other segments. As illustrated in FIG. 20, the search request of a new version is added each time the transaction search process starts on each of the segments "A" through "E." The version of the data is updated from "0" all the way to "9." As a result, FIG. 20 illustrates the transition of the versions of the data as the search target.

As illustrated in FIG. 20, a horizontally extending heavy solid line represents an execution segment of the search process of a given version. A portion enclosed by broken line represents a set of versions of data of the search target in a given segment. A horizontally extending dual-arrow headed line corresponding to segment represents a set of search requests that arrive at the search request queue 12 during the search of a given segment. A single-arrow headed broken slant line connecting the dual-arrow headed line corresponding to segment to the heavy solid line represents the segment represented by the dual-arrow headed line, i.e., the search start segment of the set of the search request and the version of the search target.

The transaction search process of a first version number (version ID) "0" starts at segment A[1]. The search process responsive to the version number "0" continues until the transaction search of segment E[1] ends.

When the transaction search process of segment A[1] is complete, a update request having arrived for the transaction search process of segment A[1] is executed. In this way, the latest version is updated to "1." A version of the search target of a second search request set that arrives in the transaction search process of segment A[1] and that starts in the search at segment B[1] is also "1." The search of the second search request set continues until the end of the transaction search process of segment A[2]. As described above, the search requests of a given version arrive in an overlapping fashion.

The overlapping of the search requests on a given segment are described below. In view of segment A[2], a set of versions serving as the search target in the transaction search process of segment A[2] includes five versions of version numbers "1" through "5." Similarly, in view of segment B[2], a set of versions serving as the search target in the transaction search process of segment B[2] includes five versions of version numbers "2" through "6."

Figure 21:
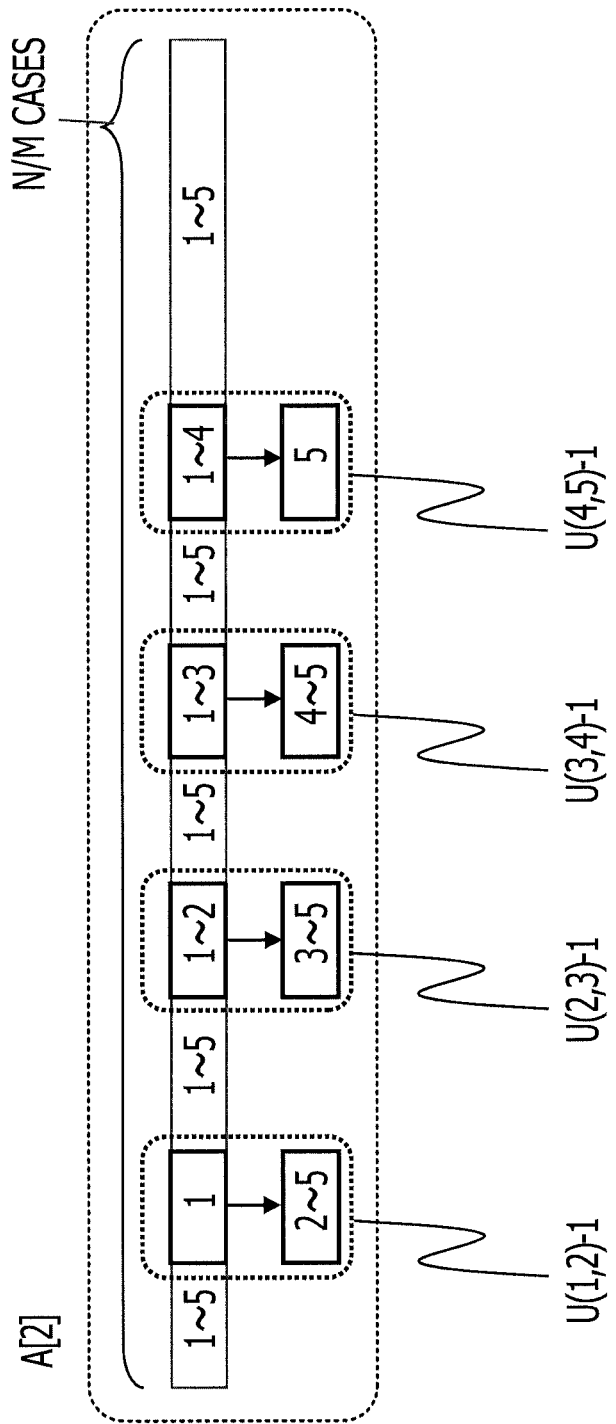
FIG. 21 illustrates another example of the search request process.

The data of the transaction search over a given segment are illustrated in FIG. 21. FIG. 21 illustrates the versions of the data of the transaction search process performed over segment A[2]. As illustrated in FIG. 21, $U(1,2)$ represents a portion that is updated from version "1" to version "2." $U(2,3)$ represents a portion that is updated from version "2" to version "3." $U(3,4)$ represents a portion that is updated from version "3" to version "4." $U(4,5)$ represents a portion that is updated from version "4" to version "5." As illustrated in FIG. 21, each update format is suffixed by "-1" to discriminate the update in FIG. 21 from the update in FIG. 23.

If $U(1,2)$-1 is the record #2, the record #2 includes a portion "2-5" that is updated with the version updated from "1" to "2," and a portion "1" that is not updated. If $U(2,3)$-1 is the record #4, the record #4 includes a portion "3-5" that is updated with the version updated from "2" to "3," and a portion "1-2" that is not updated.

Each time the version is modified with the search performed on a given segment as illustrated in FIG. 21, data of $\Delta n1$ cases are updated. If data of version numbers "1" through "5" are searched, the search is performed with data of $\Delta n1 \times 4$ cases added the original data.

A data amount $\Delta n1$ modified over one segment is determined from all the cases N of data (cases), mean search time L (seconds), and update frequency r (cases/second) as illustrated in FIG. 21. Let M represent the number of segments, and case count $\Delta n1$ updated during the search of the segment is determined by equation $\Delta n1 = L \times r / M$. The mean search case count per segment n1 is determined using equation n1=N/M+ Δn1×(M−1). Search speed v (cases/second) is determined using equation v=n1×M/L.

Figure 22:
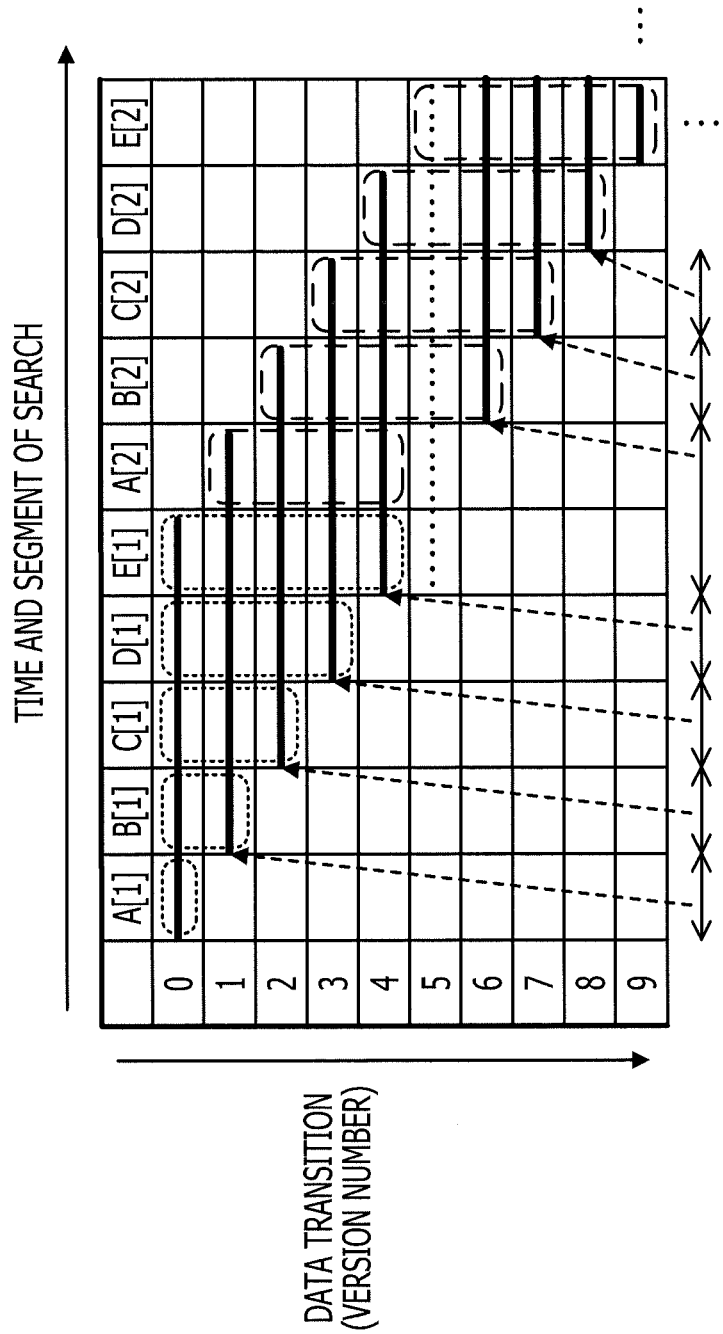
FIG. 22 illustrates another example of the search request process.

FIG. 22 illustrates an operation in which a new search request is added to a next segment B[2] rather than to a segment A[2] in the example of FIG. 20. The segment A[2] is at the start timing of the search process of the second-round segment A.

The data of version number "5" is not searched in this case. The search request for the search of the data having the version number "5" as the latest version in the second-round segment A[2] becomes nonexistent as illustrated in FIG. 22. The set of versions serving as the search target changes in five segments including segment A[2], segment B[2], segment C[2], segment D[2], and segment E[2]. The data of version number "6" are searched from segment B[2] although the data of version number "5" are not searched. The search starts from segment B[2]. In other words, the number of search requests for the next versions is doubled.

FIGS. 23A and 23B illustrate a change in the set of versions as the search target. A search request for the search of the data of version number "5" is not present in a first-round segment A[2]. Data included in the version number "5" are not searched as illustrated in FIG. 23A. In other words, a portion "5" is included in only the version number "5" in U(4,5)-2 and is not searched. The search data amount is reduced by Δn1.

The search request for the search of version 6 is present the next B[2]. Data included in only version number "5" is not present as illustrated in FIG. 23B. In other words, a portion (5-6) is searched in the search of the data of version "6" in U(4,5)-2. The search data amount is not reduced.

The search data amount caused by not searching the data of version number "5" becomes equal to a reduction of 2×Δn1 cases taking into consideration the search of segment A[2] of the version number "5" searched as the latest version and the search of segment E[2] of the version number "5" searched as the oldest version.

Figure 24:
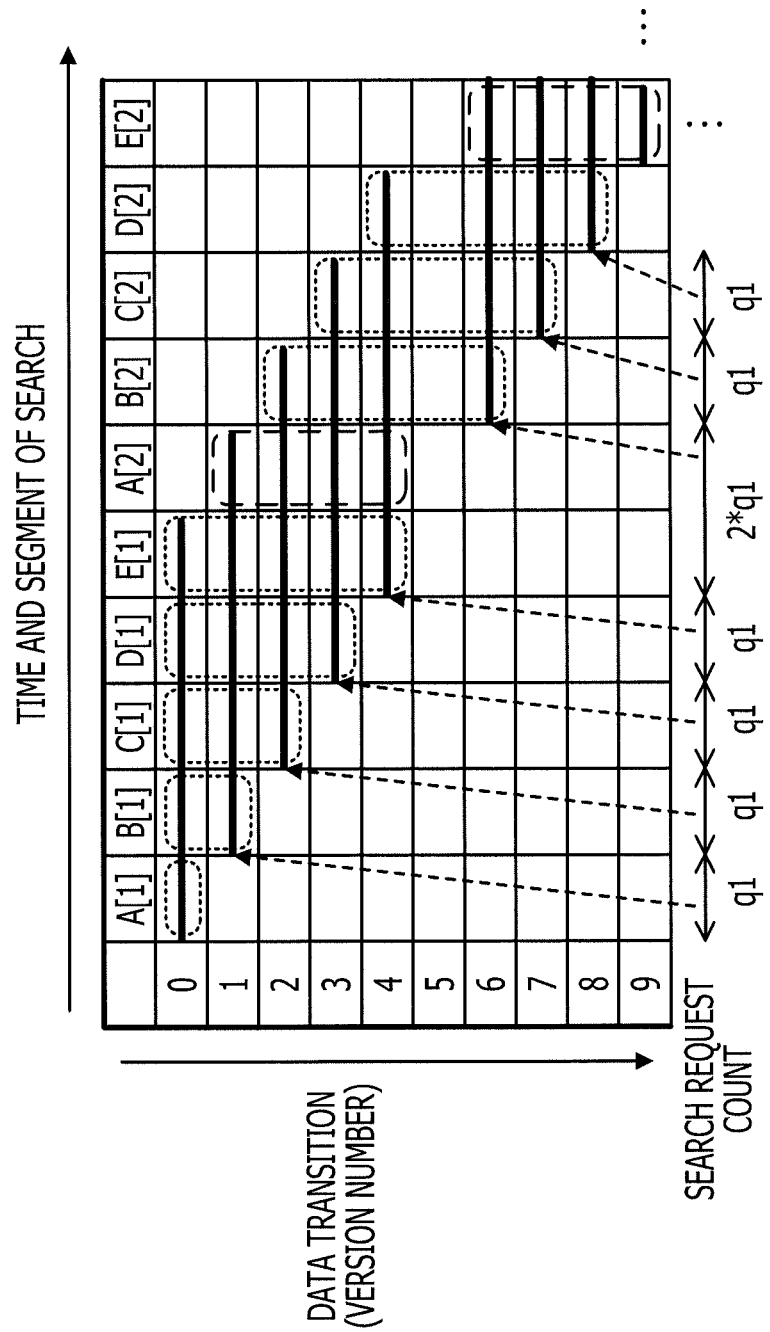
FIG. 24 illustrates another example of the search request process.

FIG. 24 illustrates an effect on a search response caused when the data of the version "5" are not searched. As illustrated in FIG. 24, the segments causing the search data amount to be reduced are A[2] and E[2]. In this way, the execution time of the search request for version numbers "1" through "4" and the execution time of the search request for version numbers "6" through "9" are reduced. Calculated described above is a total reduction in the response caused by not searching the data of the version "5" in segment A[2], i.e., the cost C for adding the search request when the data of the version number "5" are searched in segment A[2].

A reduction time Δ1 (seconds) in the search time of a target segment is calculated using equation Δ1=Δn1/v. Let s (requests/second) represent the arrival frequency of search requests, and a count q1 (requests) of search requests starting at each segment is calculated using equation q1=s×L/M. A reduction amount C in the search response (requests×s) is calculated using equation C=Δ1×(2×M−1)×q1.

The benefit B when the data of the version number "5" are searched is a reduction of one segment in the waiting time before the search start of q1 search requests having arrived in segment E[1].

The cost C and the benefit B are compared as illustrated in FIGS. 25A-25C. More specifically, the cost C is calculated as illustrated in FIG. 25A. The benefit B is calculated as illustrated in FIG. 25B. The equation for comparing the cost C with the benefit B is simplified as illustrated in FIG. 25C to v/r>2M−1. In other words, the comparison results of the cost C and the benefit B are determined by a ratio of frequency r to search speed v and a constant determined by the number of segments M. For example, if the frequency r increases, the equation v/r>2M−1 does not hold. In other words, the cost C becomes smaller than the benefit B.

Based on the update frequency r, the search speed v, and the number of segments M, the search control unit 3 determines whether the equation v/r>2M−1 holds. If the equation v/r>2M−1 holds, the search control unit 3 determines that the benefit B is higher than the cost C and then adds the search request. The response of the searching apparatus 100 is generally increased. If the equation v/r>2M−1 does not hold, the search control unit 3 determines that the benefit B is lower than the cost C and does not add the search request. A drop in the response of the searching apparatus 100 is generally controlled.

According to the disclosed embodiment, the database system controls a response delay of the transaction search process in response to the search request.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A computer-readable, non-transitory recording medium to store a searching program that causes a computer to execute a process, the process comprising:
   searching a record by a first search key from a database including records that are grouped into a plurality of record groups by searching each of the plurality of record groups sequentially in specific order according to the first search key to extract a record satisfying the first search key; and
   in case that searching the database by a second search key is requested prior to an end of the searching one of the plurality of record groups in the specific order by the first search key, searching one or more remaining record groups, which have not been searched by the first search key, in the specific order by the first search key and the second search key, the searching the one or more remaining record groups by the first search key and the second search key being processed by extracting a record satisfying either the first search key or the second search key from the one or more remaining record groups which become a search target in the specific order.

2. The recording medium according to claim 1, wherein the process further comprises:
   in case that a request of updating a specific record included in the one or more remaining record groups is requested prior to a request of the searching the database by a second search key, updating the specific record on the basis of the request and keeping both of the post-updated specific record and the pre-updated specific record; and
   wherein the post-updated record is objective to a search by the first search key and the pre-updated record is objective to a search by the second search key in case that the one or more remaining record groups are searched by the first search key and the second search key.

3. The recording medium according to claim 1, wherein the process further comprises:

in case that a request of deleting a specific record included in the one or more remaining record groups is requested, deleting the specific record after searching the one or more remaining record groups by the first search key and the second search key.

4. The recording medium according to claim 1, wherein the process further comprises:
searching one or more record groups, which have been searched by the first search key prior to a request of the searching the database by the second search key, in the specific order by the second search key to extract a record satisfying the second search key from the database, after completing the searching the plurality of record groups by the first search key and searching the one or more remaining record groups by the first search key and the second search key.

5. The recording medium according to claim 1, wherein each of the plurality of record groups includes a plurality of version of records, and
the searching each of the plurality of record groups is executed to search a record from the plurality of version of records included in the record group to be searched.

6. A searching method comprising:
searching a record by a first search key from a database including records that are grouped into a plurality of record groups by searching each of the plurality of record groups sequentially in specific order according to the first search key to extract a record satisfying the first search key; and
in case that searching the database by a second search key is requested prior to an end of the searching one of the plurality of record groups in the specific order by the first search key, searching one or more remaining record groups, which have not been searched by the first search key, in the specific order by the first search key and the second search key, the searching the one or more remaining record groups by the first search key and the second search key being processed by extracting a record satisfying either the first search key or the second search key from the one or more remaining record groups which become a search target in the specific order.

7. The searching method according to claim 6, further comprising:
in case that a request of updating a specific record included in the one or more remaining record groups is requested prior to a request of the searching the database by a second search key, updating the specific record on the basis of the request and keeping both of the post-updated specific record in the pre-updated specific record; and
wherein the post-updated record is objective to a search by the first search key and the pre-updated record is objective to a search by the second search key in case that the one or more remaining record groups are searched by the first search key and the second search key.

8. The searching method according to claim 6, further comprising:
in case that a request of deleting a specific record included in the one or more remaining record groups is requested, deleting the specific record after searching the one or more remaining record groups by the first search key and the second search key.

9. The method according to claim 6, wherein the method further comprises:
searching one or more record groups, which have been searched by the first search key prior to a request of the searching the database by the second search key, in the specific order by the second search key to extract a record satisfying the second search key from the database, after completing the searching the plurality of record groups by the first search key and searching the one or more remaining record groups by the first search key and the second search key.

10. A searching apparatus comprising:
a memory that stores a plurality of records; and
a processor that executes a process, the process including:
searching a record by a first search key from a database including records that are grouped into a plurality of record groups by searching each of the plurality of record groups sequentially in specific order according to the first search key to extract a record satisfying the first search key; and
in case that searching the database by a second search key is requested prior to an end of the searching one of the plurality of record groups in the specific order by the first search key, searching one or more remaining record groups, which have not been searched by the first search key, in the specific order by the first search key and the second search key, the searching the one or more remaining record groups by the first search key and the second search key being processed by extracting a record satisfying either the first search key or the second search key from the one or more remaining record groups which become a search target in the specific order.

11. The searching apparatus according to claim 10, wherein the process further comprises:
in case that a request of updating a specific record included in the one or more remaining record groups is requested prior to a request of the searching the database by a second search key, updating the specific record on the basis of the request and keeping both of the post-updated specific record and the pre-updated specific record; and
wherein the post-updated record is objective to a search by the first search key and the pre-updated record is objective to a search by the second search key in case that the one or more remaining record groups are searched by the first search key and the second search key.

12. The searching apparatus according to claim 10, wherein the process further comprises:
in case that a request of deleting a specific record included in the one or more remaining record groups is requested, deleting the specific record after searching the one or more remaining record groups by the first search key and the second search key.

13. The searching apparatus according to claim 10, wherein the process further includes:
searching one or more record groups, which have been searched by the first search key prior to a request of the searching the database by the second search key, in the specific order by the second search key to extract a record satisfying the second search key from the database, after completing the searching the plurality of record groups by the first search key and searching the one or more remaining record groups by the first search key and the second search key.

* * * * *